US012793564B2

(12) United States Patent
Gu

(10) Patent No.: US 12,793,564 B2
(45) Date of Patent: Nov. 10, 2026

(54) SYSTEMS AND METHODS FOR MONITORING ACTIVITIES IN AN AVIATION ENVIRONMENT

(71) Applicant: Dahe Gu, South Yarra (AU)

(72) Inventor: Dahe Gu, South Yarra (AU)

(73) Assignee: Dahe Gu, South Yarra (AU)

( * ) Notice: Subject to any disclaimer, the term of this patent is extended or adjusted under 35 U.S.C. 154(b) by 220 days.

(21) Appl. No.: 18/277,049

(22) PCT Filed: Feb. 14, 2022

(86) PCT No.: PCT/AU2022/050099
§ 371 (c)(1),
(2) Date: Aug. 11, 2023

(87) PCT Pub. No.: WO2022/170401
PCT Pub. Date: Aug. 18, 2022

(65) Prior Publication Data

US 2025/0131836 A1 Apr. 24, 2025

(30) Foreign Application Priority Data

Feb. 12, 2021 (AU) ................................ 2021900347

(51) Int. Cl.
*G08G 5/72* (2025.01)
*G01S 17/08* (2006.01)
(Continued)

(52) U.S. Cl.
CPC .............. *G08G 5/727* (2025.01); *G01S 17/08* (2013.01); *G06V 10/16* (2022.01); *G06V 10/803* (2022.01);
(Continued)

(58) Field of Classification Search
CPC . G08G 5/727; G08G 5/20; G08G 5/80; G01S 17/08; G01S 17/66; G06V 10/16; G06V 10/803; G06V 10/82
See application file for complete search history.

(56) References Cited

U.S. PATENT DOCUMENTS 5,519,618 A * 5/1996 Kastner ................. G01S 13/933 701/120
8,509,965 B2 * 8/2013 Lin .................... G01C 21/1652 340/961
(Continued)

*Primary Examiner* — David P. Merlino
*Assistant Examiner* — Mahmoud M Kazimi
(74) *Attorney, Agent, or Firm* — Bochner PLLC; Andrew D. Bochner

(57) ABSTRACT

The present invention is directed to systems and methods for monitoring activities in an aviation environment. The system includes at least two monitoring units, each including at least two types of sensors, wherein: the sensors are mounted at a plurality of locations in the aviation environment. The system further includes a processing system being configured to receive said information from the sensors, to process said information to monitor and make predictions, and to combine sensor information by applying data fusion. The system is further configured to compare sensor information with predetermined safety operation criteria, and to generate an alert signal. The method of the invention includes obtaining sensor information, receiving said information from the sensors at a processing system, processing said information, comparing the processed information with predetermined safety operation criteria, and generating an alert signal.

20 Claims, 10 Drawing Sheets

(51) Int. Cl.

| | |
|---|---|
| ***G06V 10/10*** | (2022.01) |
| ***G06V 10/80*** | (2022.01) |
| ***G06V 10/82*** | (2022.01) |
| ***G06V 20/52*** | (2022.01) |
| ***G08G 5/20*** | (2025.01) |
| ***G08G 5/80*** | (2025.01) |

(52) U.S. Cl.

CPC .............. *G06V 10/82* (2022.01); *G06V 20/52* (2022.01); *G08G 5/20* (2025.01); *G08G 5/80* (2025.01)

(56) References Cited

U.S. PATENT DOCUMENTS

| | | | | |
|---|---|---|---|---|
| 11,500,099 | B2 * | 11/2022 | Liang | G01S 17/89 |
| 11,507,783 | B2 * | 11/2022 | Lee | G06F 18/2193 |
| 12,307,912 | B1 * | 5/2025 | Poojary | B64D 45/00 |
| 2016/0196754 | A1 * | 7/2016 | Surace | G08G 5/51<br>701/117 |
| 2019/0265714 | A1 * | 8/2019 | Ball | G05D 1/024 |

* cited by examiner

SYSTEMS AND METHODS FOR MONITORING ACTIVITIES IN AN AVIATION ENVIRONMENT

RELATED APPLICATION

This application claims priority to Australian patent application no. 2021900347 filed on 12 Feb. 2021, the entire contents of which is hereby incorporated by reference herein in its entirety.

FIELD OF THE INVENTION

This invention relates to systems and methods for monitoring activities in an aviation environment, including near and at airports.

BACKGROUND

Airports and aircraft typically employ various systems that help to prevent imminent or hazardous situations that have the potential to develop into incidents or serious incidents or accidents near or at the airport. Aviation safety incidents or serious incidents or accidents are herein referred as occurrences. These systems (commonly referred to as 'safety nets') usually have the capability to detect, identify, and track movements of aircraft, vehicles and personnel within the operating environment near and at the airport and can include both ground and airborne-based safety nets.

Ground-based safety nets are provided as an important component of the Air Traffic Management system to allow air traffic controllers to manage air traffic. Using primarily Air Traffic Services surveillance data, they provide warning times of up to two minutes. Upon receiving an alert, air traffic controllers are expected to promptly assess the situation and take appropriate action.

Advanced Surface Movement Guidance & Control System (A-SMGCS) is a system providing routing, guidance and surveillance for the control of aircraft and vehicles to prevent traffic conflicts near and at the airport and typically comprises several different systems/safety nets. Its surveillance infrastructure can consist of a Non-Cooperative Surveillance (e.g. surface movement radar, microwave sensors, optical sensors, Automatic Dependent Surveillance-Broadcast (ADS-B), commercial cellular networks) and Cooperative Surveillance (e.g. multilateration systems). The A-SMGCS system focuses on the prevention and mitigation of air traffic conflicts near and at airport. Specifically, it can include one or more of the following ground-based safety nets:

Short Term Conflict Alert (STCA); this is a ground-based safety net intended to assist the air traffic controller in preventing collision between aircraft by generating, in a timely manner, an alert of a potential or actual infringement of separation minima.

Area Proximity Warning (APW); this is a ground-based safety net which uses surveillance data and flight path prediction to warn the air traffic controller when an aircraft is, or is predicted to be, flying into a volume of notified airspace, such as controlled airspace, danger areas, prohibited areas and restricted areas.

Minimum Safe Altitude Warning (MSAW); this is a ground-based safety net intended to warn the air traffic controller about increased risk of controlled flight into terrain accidents by generating, in a timely manner, an alert of aircraft proximity to terrain or obstacles.

Approach Path Monitor (APM); this is a ground-based safety net intended to warn the controller about increased risk of controlled flight into terrain accidents by generating, in a timely manner, an alert of aircraft proximity to terrain or obstacles during final approach.

Airborne safety nets are fitted on aircraft and provide alerts and resolution advisories directly to the pilots. Warning times are generally shorter, up to 40 seconds. Pilots are expected to immediately take appropriate avoiding action. Specifically, it can include one or more of the following airborne based safety nets:

Enhanced/Ground Proximity Warning System (GPWS/EGPWS) reduces the risk of controlled flight into terrain by providing flight crews with timely, accurate information about terrain and obstacles in the area. The system uses various aircraft inputs and an internal database to predict and warn flight crews of potential conflicts with obstacles or terrain.

High Energy Approach Monitoring Systems (HEAMS) warns the pilots if the energy predicted at touch down exceeds a predetermined safe level.

Runway Overrun Protection Systems (ROPS) provides pilots with a real-time constantly updated picture in the navigation display of where the aircraft will stop on the runway in wet or dry conditions.

The current systems comprising the presently known ground and airborne safety nets have a number of disadvantages. First, these systems are confined to detect and monitor five occurrence types that are described above, i.e., traffic conflicts, airspace infringement, controlled flight into terrain, unsafe approach and runway overrun. Yet there are many other potential operational aviation safety risks that are associated with other occurrence types that occur near and at airports, which are not yet well monitored by existing systems and/or procedures performed by human operators. For example, runway incursion, runway undershoots, unstable approach, missed approach/go-around, foreign object damage (e.g. runway debris), ground strike.

Further, the present ground and airborne-based safety nets also necessitate the use of multiple independent and complex systems, which are expensive and resource-intensive to install, operate and maintain. Specifically, it requires a significant number of multiple types of sensors to be fit on aircraft, and/or ground vehicles, and/or ground locations near and at airport, and requires system integration—this leads to long installation periods and thus interruption to normal airport operation. Further there is a high implementation and operating cost, including training for airport controllers and airline staff, with sensors required to be fit on every aircraft, ground vehicle and crew member to provide comprehensive cover. Further, it is accordingly expensive and difficult to maintain, upgrade, retrofit or develop new capability, and any such maintenance, upgrade or retrofit is also likely to disrupt operation. In particular, software installations or upgrades, in addition to the hardware installations or upgrades mentioned above, are not easy to introduce.

Moreover, the present ground and airborne-based safety nets have limited object detection, classification and tracking/position capabilities and therefore limited situation awareness. In particular, their detection and tracking capabilities are limited to point-wise tracking and positioning of individual aircraft, and its relative location to certain reference points/areas i.e., runway boundaries, entry and exit points and the like. Moreover, object details such as object features (aircraft landing gear, engine), shape, size, class and object classes other than aircraft are not well monitored by using these safety nets.

The present ground and airborne-based safety nets further have limited safe operation assessment capability, which are constrained by the limited amount of information acquired, a limited capability to understand and assess complex behaviours/activity patterns, and a limited capacity to simultaneously perform multiple safe operation assessments.

Examples of the invention seek to solve or at least ameliorate one or more disadvantages of the existing ground and airborne-based safety nets. In particular examples, the invention may preferably provide one or more of the following:

- enhanced situation awareness of unsafe aviation activities to human operators and operating systems, e.g. Air Traffic Control officers, pilots, aircraft on-board systems that control the aircraft and emergency response team including:
  - awareness of all objects and activities within the aviation operating environment near and at airport;
  - prompt detection and awareness (within seconds) of deviation from and/or violation of safe aviation operation criteria;
  - human operators and/or operating systems can immediately assess the detected and identified unsafe aviation activities, and implement appropriate corrective actions;
- prevention of aviation safety occurrences or reduction of severity/cost of aviation safety occurrences;
- increased redundancy to the existing technologies and procedures that detect/identify/prevent/mitigate unsafe aviation activities;
- a more cost-effective solution/technique/system compared to existing systems described above;
- reduced reliance on human involvement, e.g. human observation at Air Traffic Control;
- minimum changes to current procedures or workload, in particular when maintaining, retrofitting or upgrading hardware or software.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

SUMMARY OF THE INVENTION

According to an aspect of the present invention there is provided a system for monitoring activities in an aviation environment, the system including: at least two sensors wherein each sensor is adapted to obtain sensor information of at least one object, the at least two sensors being located in at least one pre-determined location in the aviation environment, the sensor information obtained from one sensor being different from the other(s); a processing system being configured to receive said information from the sensors and being further configured to process said information to monitor said at least one object wherein the system is further configured to compare the information associated with the at least one object with predetermined safety operation criteria, and to generate an alert signal when the compared information indicates unsafe operation.

The processing system can be configured to combine the different information from the at least two sensors by associating the sensor information with time information. Preferably, the processing system is configured to combine the different information from the at least two sensors by associating the sensor information with spatial information.

Preferably, combining information from the at least two sensors comprises data fusion.

Preferably, data fusion comprises sensor calibration and/or time-syncing.

The at least two sensors preferably comprise two types of sensors.

The processing system can be configured to calculate depth (i.e. range) information by using sensor information from a first sensor of the at least two sensors. Preferably the processing system is configured to determine identity and/or classification information of at least one object by using sensor information from a second sensor of the at least two sensors.

The at least two sensors can include light detection and ranging sensors (LiDAR), or other types of ranging sensors, and camera sensors. Other types of ranging sensors may include radar, sonar or ultrasonic rangefinders. The processing system may be configured to calculate range information from sensor information from at least one LiDAR sensor, or other type(s) of ranging sensor, via analysis of LiDAR sensor or other types of ranging sensor information. The processing system may be configured to calculate identity and/or classification information from at least one camera sensor via the application of a machine-learning and/or deep-learning detection and/or classification process.

The processing system is preferably configured to associate the range/depth information and identity/classification information from the at least two sensors to identify at least one object in the field of view of the at least two types of sensors.

The processing system is configured to associate at least one detected and/or identified object with time information thereby allowing measurement and/or tracking at least one physical property of the at least one object over time. Preferably, the processing system is configured to predict the at least one object's at least one physical property from tracked physical property information. Physical properties may include location, travel direction, velocity, acceleration, distance travelled/motion track/travel path, elevation and/or interactions with other objects. It may also include the relative properties such as relative velocities, relative distances of a group of objects from another object, for example. The comparison of the information associated with the at least one object with predetermined safety operation criteria can include measured physical property information and predicted physical property information from the at least one object.

The processing system may be configured to generate an alert signal when the compared information indicates a risk of a predicted occurrence of unsafe operation. Preferably unsafe operation includes occurrences on or near a runway, occurrences involving ground operation, occurrences involving aircraft control, occurrences involving environment and/or infrastructure. Occurrences can include aviation safety incidents, serious incidents or accidents.

Preferably, the alert signals are represented and/or communicated as a visual and/or audio signal. Preferably, the alert signals enable human operators to make informed decisions and implement actions.

The at least two sensors can be housed in a monitoring unit and the monitoring unit is one of a plurality of spaced-apart monitoring units. One or more of said plurality of said monitoring units can be mounted at one or more locations throughout the aviation environment near and at an airport including runway, taxiway, apron, ramp areas, passenger boarding bridges, ground service vehicles, ground support vehicles, ground crew, airport building structures including gates, and aircraft.

Preferably, the system comprises two (2) or more monitoring units.

Preferably, the system comprises a number of monitoring units sufficient to provide comprehensive volumetric surveillance coverage of the aviation environment.

Preferably, the system comprises a number of monitoring units sufficient to substantially remove, or eliminate, blind spots in the surveillance coverage.

Preferably, the number of monitoring units depends on the layout of the aviation environment (e.g. number of runways, runway length, apron size), activity type (commercial flight, training) and risk profile of a particular airport.

The at least one object can be a moving or stationary object in the at least one location in the aviation environment including aircraft, ground support vehicles, ground crew, runway, taxiway, apron ramp areas, passenger boarding bridges, ground service vehicles, ground support vehicles, ground crew, airport building structures including gates, and the operating environment near and/or on the runway.

According to another aspect of the present invention there is provided a method for monitoring activities in an aviation environment, the method including the steps of: obtaining sensor information of at least one object from at least two sensors, the at least two sensors being located in at least one pre-determined location in the aviation environment, wherein the sensor information obtained from one sensor is different from the other(s); receiving said information from the sensors at a processing system being configured to process said information to monitor said at least one object; and comparing the processed information associated with the at least one object with predetermined safety operation criteria, and to generate an alert signal when the compared information indicates unsafe operation According to yet another aspect of the present invention there is provided a system for monitoring activities in an aviation environment near and at an airport, the system including: an aviation operating environment near and at the airport with a plurality of aircraft, runways, taxiways, aprons, ramp areas, passenger boarding bridges, ground service vehicles, ground support vehicles, ground crew, and airport building structures including gates and other objects such as animals and remotely piloted aircraft, a plurality of monitoring units mounted at one or more locations throughout the aviation environment near and at the airport including one at or more of the following locations: a runway, taxiway, apron, ramp areas, passenger boarding bridges, ground service vehicles, ground support vehicles, ground crew, airport building structures including gates, and aircraft, wherein the system is configured to produce continuous and real-time data representing the aviation activities within said aviation environment near and at the airport from said one or more locations, each monitoring unit comprises at least two types of sensors wherein each sensor is configured to produce/obtain/transmit sensor information of at least one object from at least one pre-determined location in the aviation environment near and at the airport, the sensor information produced/obtained/transmitted from one type of sensor being different from the other(s); an artificial intelligence-based data processing system comprising artificial intelligence models and other processing algorithms being configured to receive and fuse said real time data representing the aviation activities within said aviation environment near and at the airport from said one or more locations in a secure encrypted form, and being further configured to process said information to detect, identify, track and monitor said at least one object in the operational aviation environment near and at the airport from said one or more locations; wherein the system is further configured to compare the information associated with the at least one object in the said aviation environment from said one or more locations with predetermined safety operation criteria, and to generate an alert signal when the compared information indicates unsafe operation; wherein the system is further configured to produce representations of said aviation activities within said aviation environment near and at the airport from said one or more locations, and to communicate said one or more representations in a secure encrypted form; and devices to receive said communicated said one or more representations located in one or more of, or any combination of the following: a cockpit of said aircraft, air traffic control towers/centres, ground control locations and/or airport emergency response team locations.

According to still yet another aspect of the present invention there is provided a method for monitoring aviation activities in an aviation environment, the method including the steps of: providing a plurality of monitoring units, each comprising at least two types of sensors, namely at least a camera and at least a LiDAR, the monitoring units being positioned in one or more locations throughout the aviation environment near and at an airport; producing/obtaining and transmitting sensor information of at least one object from the at least two types of sensors from at least one monitoring unit, the at least one monitoring unit being located in at least one pre-determined location in the aviation environment near and at the airport, the sensor information being in a secure encrypted form wherein the sensor information obtained from one sensor type being different from the other(s) sensor type(s); receiving said information from the sensors by an artificial intelligence-based data processing system comprising artificial intelligence models and other processing algorithms being configured to fuse and process said information to detect, identify, track and monitor said at least one object in the aviation environment near and at the airport; comparing the processed information associated with the at least one object with predetermined at least one safety operation criteria, generating an alert signal when the compared information indicates unsafe operation; producing representations of said aviation activities within said aviation environment near and at the airport from said one or more locations; communicating said one or more representations in a secure encrypted form; and devices to receive said communicated said one or more representations located in one or more of, or any combination of the following: a cockpit of said aircraft, air traffic control towers/centres, ground control locations and airport emergency response team locations.

According to a further aspect of the invention, there is provided a system for monitoring activities in an aviation environment, the system including:

at least two monitoring units, each monitoring unit including at least two types of sensors comprising a range sensor and a camera sensor, wherein: the sensors are adapted to obtain sensor information of, or in relation to, at least two objects, including at least one runway and at least one aircraft, and the sensors are mountable at a plurality of locations in the aviation environment, including at least one location at or near the runway;

a processing system being configured to receive said information from the sensors and being further configured to process said information to monitor and make predictions in relation to said at least two objects, wherein: the processing system is configured to combine the range sensor information with the camera sensor information by applying data fusion to associate the sensor information with temporal information and spatial information; and, applying data fusion includes applying a time-syncing process and/or a sensor calibration process to the sensor information;

the processing system being further configured to compare the temporally and spatially associated sensor information of the at least two objects with predetermined safety operation criteria, and to generate an alert signal when the compared information indicates a risk or likelihood of at least one occurrence type in each of a first occurrence group of unsafe operation, and in a second occurrence group of unsafe operation, wherein: the first occurrence group comprises one or more runway occurrence types on or near the runway, including one or more of, or any combination of: runway excursion, runway incursion, runway undershoot, depart/approach/land wrong runway, missed approach/ go around, and/or rejected take off; and the second occurrence group comprises one or more aircraft control occurrence types, including one or more of, or any combination of: unstable approach, hard landing, ground strike, controlled flight into terrain, and/or ground proximity alerts/warnings.

The system may be further configured to generate an alert signal when the compared information indicates a risk or likelihood of at least one occurrence type in each of a third occurrence group comprising ground operation occurrence types, and in a fourth occurrence group comprising environment occurrence types. The ground operation occurrence types may comprise one or more of, or any combination of: foreign object damage/debris, jet blast/propeller/rotor wash, or taxiing collision. The environment occurrence types may comprise one or more of, or any combination of: icing, lightning strike, or animal/bird strike.

The system may be further configured to generate an alert signal when the compared information indicates a risk or likelihood of at least one occurrence type in a fifth occurrence group comprising infrastructure occurrences, including runway lighting occurrences or other infrastructure type occurrences.

The range sensor may comprise a LiDAR sensor and the processing system is preferably configured to calculate range information of at least one object of the at least two objects by using sensor information from the LiDAR sensor.

The processing system is preferably configured to determine identity and/or classification information of at least one object of the at least two objects by using sensor information from the camera sensor and processing said sensor information using an artificial intelligence-based processing method. Preferably, the processing system is configured to apply a deep- and/or machine-learning detection process to calculate the identity and/or classification information.

The processing system is preferably configured to associate the range information and the identity and/or classification information from the sensors to identify the at least one object in the field of view of the sensors. The processing system may be configured to associate the at least one identified object with time information, thereby provides measurement and/or tracking at least one physical property of the at least one identified object over time. The processing system is preferably configured to predict a physical property of the at least one identified object from tracked physical property information. The comparison of the information associated with the at least one identified object with the predetermined safety operation criteria preferably includes comparing or otherwise applying measured physical property information and predicted physical property information from the at least one identified object.

Preferably, the measured and predicted physical property includes the aircraft's position, travel direction, velocity, acceleration, altitude and attitude, and other physical properties of aircraft of interest, and physical properties of other objects of interest including boundaries, markings, a centreline, a runway threshold, ground crew, a passenger, a ground vehicle, infrastructure and/or building structures.

The system is preferably configured to monitor the aircraft ground location and/or measure and/or calculate an estimate or prediction of the aircraft position or motion on the runway, aircraft position deviation from runway centreline, distance between aircraft and runway boundary and/or runway end, and a predicted time and/or position for runway excursion including veer-off.

The system is preferably configured to monitor an aircraft approach flight path and an aircraft landing configuration, to measure and/or calculate an estimate or prediction of acceptable deviation of measured flight path from an authorised or ideal flight path, and a likelihood of achieving safe touchdown or landing.

The system may be configured to monitor and/or track the aircraft location, and/or measure and/or calculate an estimate or prediction of the lift-off position, and a last safe stopping point along a take-off roll.

The system may be configured to receive and process additional information to assist with and/or facilitate calculation of the at least two objects' physical properties, an estimation or prediction of their physical properties and/or the safe operation criteria. The additional information includes one or more of, or any combination of the following: runway data, including runway length, boundaries, entries and exits, surface characteristics such as material or friction coefficients, and/or surface conditions such as wet, ice/snow, metrological data such as wind, temperature and the like, and aircraft data, such air craft type and capabilities/ characteristics, weight, flying phase and/or intended or reference position or motion.

The system may be further configured to compare the measured or predicted physical properties of the aircraft and the runway to the safe operation criteria to determine the potential runway excursion risks. Preferably, the likelihood of runway excursion is predicted by monitoring distance between aircraft landing gears/fuselage/wingtip and runway side boundary for veer off and by monitoring runway distance remaining for runway overrun.

The system may be configured to receive information from one or more existing aviation safety-net systems to facilitate processing of information, and calculation of measured operational physical properties and prediction thereof, to act as a redundancy to the existing systems. The at least two objects may include one or more of, or a combination of the following:

ground vehicles, ground crew, taxiway, apron ramp areas, passenger boarding bridges, airport building structures, infrastructure, and the operating environment near and on the runway.

The plurality of locations in the aviation environment preferably includes at least one location on the aircraft.

The plurality of locations in the aviation environment includes one or more of, or any combination of, the following: on or near a taxiway; on or near an apron, a ramp area and/or a passenger boarding bridge; on or near a ground service vehicle, a ground support vehicle and/or ground crew; and/or on or near an airport building and/or infrastructure.

In accordance with a further aspect of the invention, there is provided a method for monitoring activities in an aviation environment, the method including the steps of:

obtaining sensor information of, or in relation to, at least two objects from at least two monitoring units, the objects including at least one runway and at least one aircraft, the at least two monitoring units being mounted at a plurality of locations in the aviation environment including at least one location at or near the runway; the monitoring units each housing at least two types of sensors, including a range sensor and a camera sensor, receiving said information from the sensors at a processing system being configured to process said information to monitor and make predictions in relation to said at least two objects; the processing system being configured to combine the range sensor information with the camera sensor information by associating the sensor information with temporal information and spatial information by data fusion, including sensor calibration and/or time-syncing;

comparing the processed information associated with the at least two objects with predetermined safety operation criteria, generating an alert signal when the compared information indicates a risk or likelihood of at least one occurrence type in each of a first occurrence group of unsafe operation types and a second occurrence group of unsafe operation types, wherein: the first occurrence group comprises one or more runway occurrence types on or near the runway, including one or more of, or any combination of: runway excursion, runway incursion, runway undershoot, depart/approach/land wrong runway, missed approach/go around, and rejected take off; and the second occurrence group comprises one or more aircraft control occurrence types, including one or more of, or any combination of: unstable approach, hard landing, ground strike, controlled flight into terrain, and ground proximity alerts/warnings.

Preferably, the range sensor is a LiDAR sensor.

In accordance with a further aspect of the invention, there is provided a system for monitoring activities in an aviation environment, the system including:

a plurality of monitoring units mounted at locations in or throughout the aviation environment near and at an airport, wherein at least one monitoring unit is located on, at or near one or more of the following: a runway; a taxiway; an apron, a ramp area and/or a passenger boarding bridge; a ground service vehicle, a ground support vehicle and/or ground crew; an airport building structure and/or infrastructure; and an aircraft;

to produce continuous and real-time data representing the aviation activities within said aviation environment near and at the airport from said locations, wherein: each monitoring unit includes at least two types of sensors comprising a range sensor and a camera sensor, and the sensors are adapted to produce, obtain or transmit sensor information of, or in relation to, the following objects, including: at least one runway; at least one taxiway; at least one apron/ramp area and/or boarding bridge; at least one ground service vehicle/ground support vehicle and/or ground crew; at least one airport building structure and/or infrastructure; and at least one aircraft;

an artificial intelligence-based data processing system comprising artificial intelligence models and other processing algorithms being configured to receive and fuse said real-time data representing the aviation activities in a secure encrypted form, and being further configured to process said information to detect, identify, track and/or monitor said objects in the operational aviation environment; wherein:

the system is configured to combine the range sensor information with the camera sensor information by associating the sensor information with temporal information and spatial information by data fusion, using sensor calibration and/or time-syncing;

the system is further configured to compare the information associated with said objects in the aviation environment with predetermined safety operation criteria, and to generate an alert signal when the compared information indicates a risk or likelihood of at least one occurrence type in each of a first occurrence group of unsafe operation types and a second occurrence group of unsafe operation types, wherein: the first occurrence group comprises one or more runway occurrence types on or near the runway, including one or more of, or any combination of: runway excursion, runway incursion, runway undershoot, depart/approach/land wrong runway, missed approach/go around, and rejected take off; and the second occurrence group comprises one or more aircraft control occurrence types, including one or more of, or any combination of: unstable approach, hard landing, ground strike, controlled flight into terrain, and ground proximity alerts/warnings;

the system is further configured to produce representations of said aviation activities within said aviation environment, and to communicate said one or more representations in a secure encrypted form;

the system further including devices to receive said communicated one or more representations in at least one of a cockpit of said aircraft, an air traffic control tower/centre, a ground control location and an airport emergency response team location.

In accordance with a further aspect of the invention, there is provided a method for monitoring aviation activities in an aviation environment, the method including the steps of:

providing a plurality of monitoring units mounted at locations throughout the aviation environment near and at an airport, wherein at least one monitoring unit is located on, at or near, one or more of each of the following: a runway; a taxiway; an apron, a ramp area and/or a passenger boarding bridge; a ground service vehicle, a ground support vehicle and/or ground crew; an airport building structure and/or infrastructure; and an aircraft;

to produce continuous and real-time data representing the aviation activities within said aviation environment near and at the airport from said locations, wherein:

each monitoring unit includes at least two types of sensors comprising a range sensor and a camera sensor, and the sensors are adapted to produce, obtain or transmit sensor information of, or in relation to, each of the following objects, including: at least one runway; at least one taxiway; at least one apron/ramp area and/or boarding bridge; at least one ground service vehicle/ground support vehicle and/or ground crew; at least one airport building structure and/or infrastructure; and at least one aircraft;

producing or obtaining and transmitting sensor information of the objects in a secure encrypted form;

receiving said information from the sensors by an artificial intelligence-based data processing system comprising artificial intelligence models and other processing algorithms being configured to receive, combine and process said real-time data, to detect, identify, track and/or monitor said objects in the aviation environment; wherein combining said data includes associating the range sensor information and the camera sensor information with temporal information and spatial information by data fusion, using sensor calibration and/or time-syncing;

generating an alert signal when the compared information indicates a risk or likelihood of at least one occurrence type in each of a first occurrence group of unsafe operation types and a second occurrence group of unsafe operation types, wherein: the first occurrence group comprises one or more runway occurrence types on or near the runway, including one or more of, or any combination of: runway excursion, runway incursion, runway undershoot, depart/approach/land wrong runway, missed approach/go around, and rejected take off; and the second occurrence group comprises one or more aircraft control occurrence types, including one or more of, or any combination of: unstable approach, hard landing, ground strike, controlled flight into terrain, and ground proximity alerts/warnings;

and producing representations of said aviation activities within said aviation environment, and communicating said representations in a secure encrypted form to devices located at least one of a cockpit of said aircraft, an air traffic control tower/centre, a ground control location and an airport emergency response team location.

The features described in relation to one or more aspects of the invention are to be understood as applicable to other aspects of the invention. More generally, combinations of the steps in the method of the invention and/or the features of the system of the invention described elsewhere in this specification, including in the claims, are to be understood as falling within the scope of the disclosure of this specification.

The methods and/or systems of the invention may be applied as new systems or methods. However, the systems and/or methods of the invention are also suited to retrofit, or partly retrofit, existing systems or methods including in relation to existing aviation safety nets. The invention is conceived to, in some forms, take advantage of such existing system and method in order to assist in delivering one or more benefits of the invention.

Other aspects of the invention are also disclosed.

BRIEF DESCRIPTION OF THE DRAWINGS

The present invention will now be described, by way of non-limiting example, with reference to the accompanying drawings in which.

DETAILED DESCRIPTION OF THE INVENTION

Preferred features of the present invention will now be described with particular reference to the accompanying drawings. However, it is to be understood that the features illustrated in and described with reference to the drawings are not to be construed as limiting on the scope of the invention.

Referring now to FIGS. 1 to 10 there are illustrated safety operation assessment systems and methods for monitoring activities in an aviation environment according to preferred embodiments of the present invention.

Figure 1:
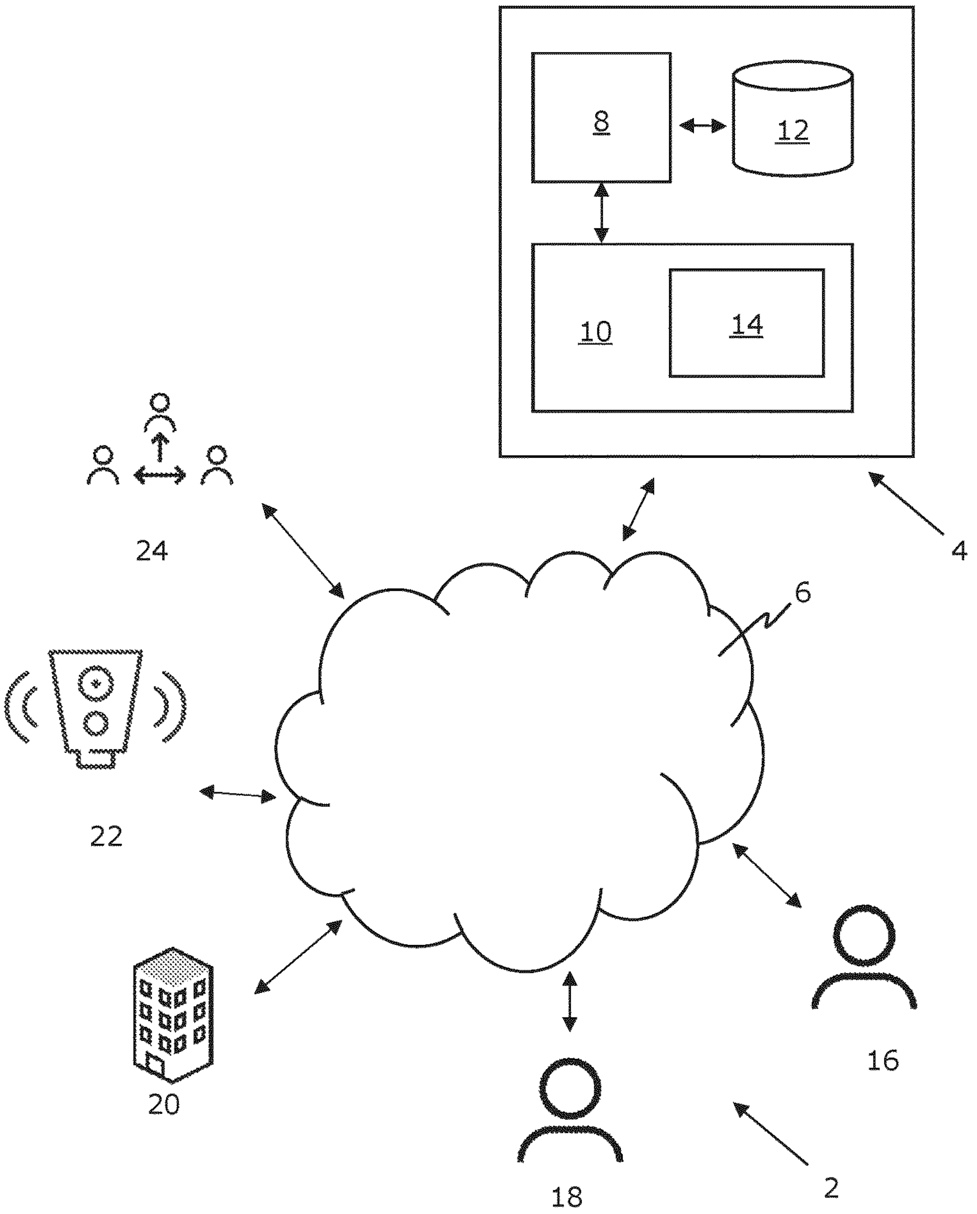
FIG. 1 is a functional diagram of a safety operation assessment system for monitoring activities in an aviation environment according to a preferred embodiment of the present invention.

FIG. 1 illustrates a functional diagram of an exemplary system 2 within which the present invention may be embodied. The system 2 comprises a host service 4 ("processing system") which is configured as described in greater detail below, in accordance with a preferred embodiment of the present invention, connected to a plurality of parties 16, 18, 20 over a network 6. The host service 4 is configured to facilitate engagement between at least one user 16, 18, 20, of the processing system 4 and one or more monitoring units 22 which can collect information from the aviation environment, particularly the aviation environment near and at airports. The users 16, 18, 20 are workers or companies that operate in the aviation environment, such as aircraft crew, ground crew, traffic control officers, emergency response teams and the like. The host service 4 are connectable via the network 6 to other third parties 24, for example fire attendance services or emergency government authorities or accident investigation agencies.

The exemplary host service 4 comprises one or more host servers that are connected to a network 6, and therefore communicate via that network 6 via wired or wireless communication in a conventional manner as will be appreciated by those skilled in the art. The host servers are configured to store a variety of information collected from the users/units 16, 18, 20, 22 and 24.

The host servers are also able to house multiple databases necessary for the operation of methods and systems of the present invention. The host servers comprise any of a number of servers known to those skilled in the art and are intended to be operably connected to the network so as to operable link to a computer system associated with the users 16, 18, 20 or third parties, 22 or 24. The host servers can be operated and supplied by a third party server providing service, or alternatively can be hosted locally by the processing system 4.

The host server 4 typically includes a central processing unit (CPU) and/or at least one graphics processing unit (GPU) 8 or the like which includes one or more microprocessors, and memory 10, and storage medium 12 for housing one or more databases, operably connected to the CPU and/or GPU and/or the like. The memory 10 includes any combination of random-access memory (RAM) or read only memory (ROM), and the storage medium 12 comprises magnetic hard disk drives(s) and the like.

The storage medium 12 is used for long term storage of program components as well as storage of data relating to the customers and their transactions. The central processing unit and/or graphics processing unit 8 which is associated with random access memory 10, is used for containing program instructions and transient data related to the operation of services provided by the host service 4. In particular, the memory 10 contains a body of instructions 14 for implementing at least part of a method for safety operation assessment in an aviation environment. The instructions 14 enable multiplatform deployment of the system 2, including on desktop computer, edge devices such as NVIDIA DRIVE or Jetson embedded platform. The instructions 14 also include instructions for providing a web-based user interface which enables users to remote access the system 2 from any client computer executing conventional web browser software.

Each user 16, 18, 20, 22, 24 is able to receive communication from the host service 4 via the network 16 and is able to communicate with the host service 4 via the network 6. Each user 16, 18, 20, 22, 24 may access the network 6 by way of a smartphone, tablet, laptop or personal computer, or any other electronic device. The host service 4 may be provided with a dedicated software application which is run by the CPU and/or GPU and/or the like stored in the host servers. Once installed, the software application of the host service 4 provides an interface that enables the host service 4 to facilitate communication of information and/or alerts, including sensor information, raw or processed, to a predetermined user 16, 18, 20.

In a preferred embodiment, the computing network 6 is the internet or a dedicated mobile or cellular network in combination with the internet, such as a GSM, CDMA, UTMS, WCDMA or LTE networks and the like. Other types of networks such as an intranet, an extranet, a virtual private network (VPN) and non-TCP/IP based networks are also envisaged.

Figure 2:
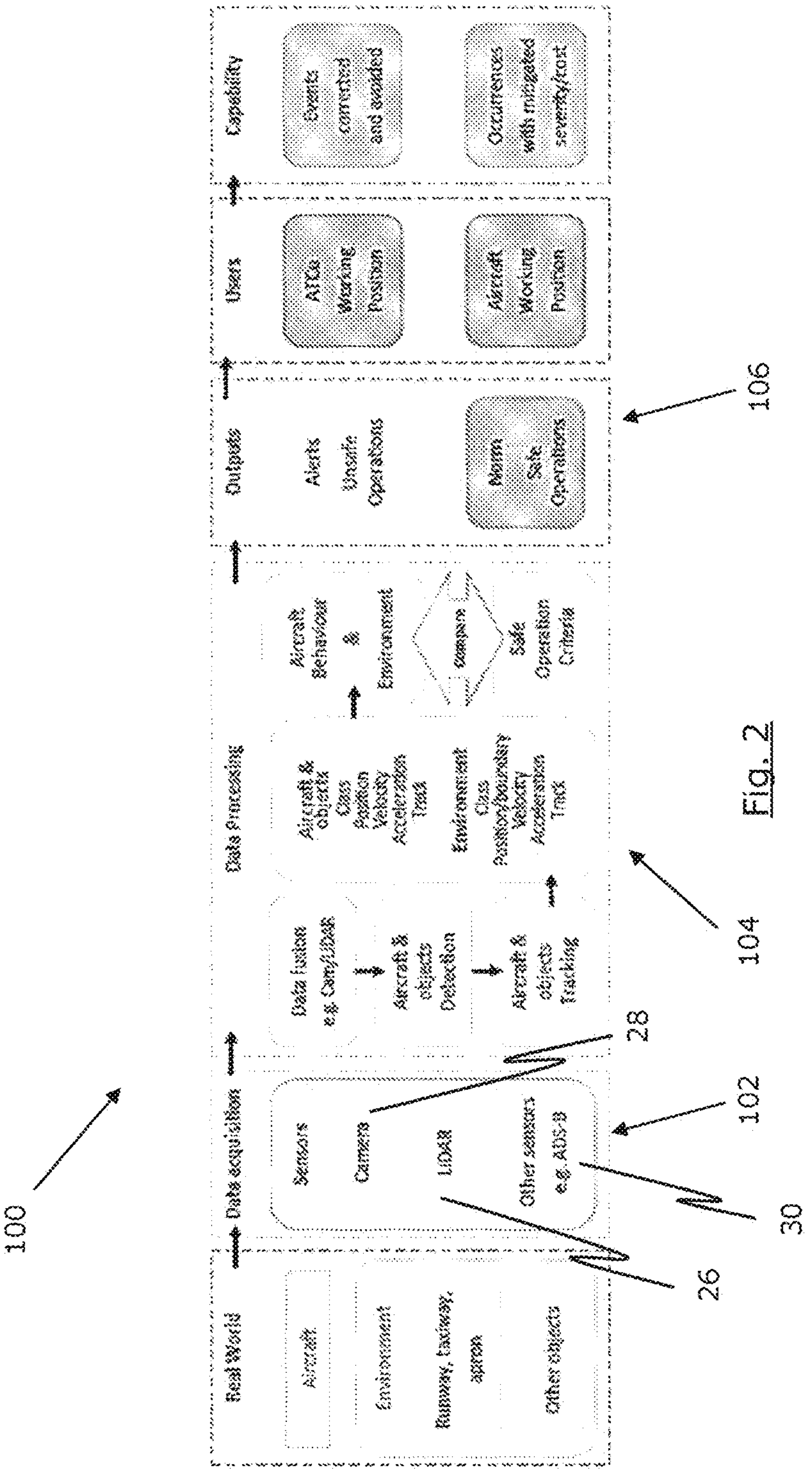
FIG. 2 is a schematic diagram illustrating a method for monitoring activities in an aviation environment according to a preferred embodiment of the present invention using the system of FIG. 1.

With reference to FIG. 2, method 100 has at least two sensors 26, 28, 30 for obtaining sensor information from at least one pre-determined location in the aviation environment. Each sensor is preferably of a different type to the other such that they obtain different sensor information, which advantageously complements each other's data acquisition capability. Preferably, each one of the at least two sensors 26, 28, 30 is housed in a plurality of monitoring units provided substantially equidistantly and/or strategically spaced about the aviation environment for the purposes of providing effective and efficient monitoring coverage of the operational aviation activity.

Figure 4:
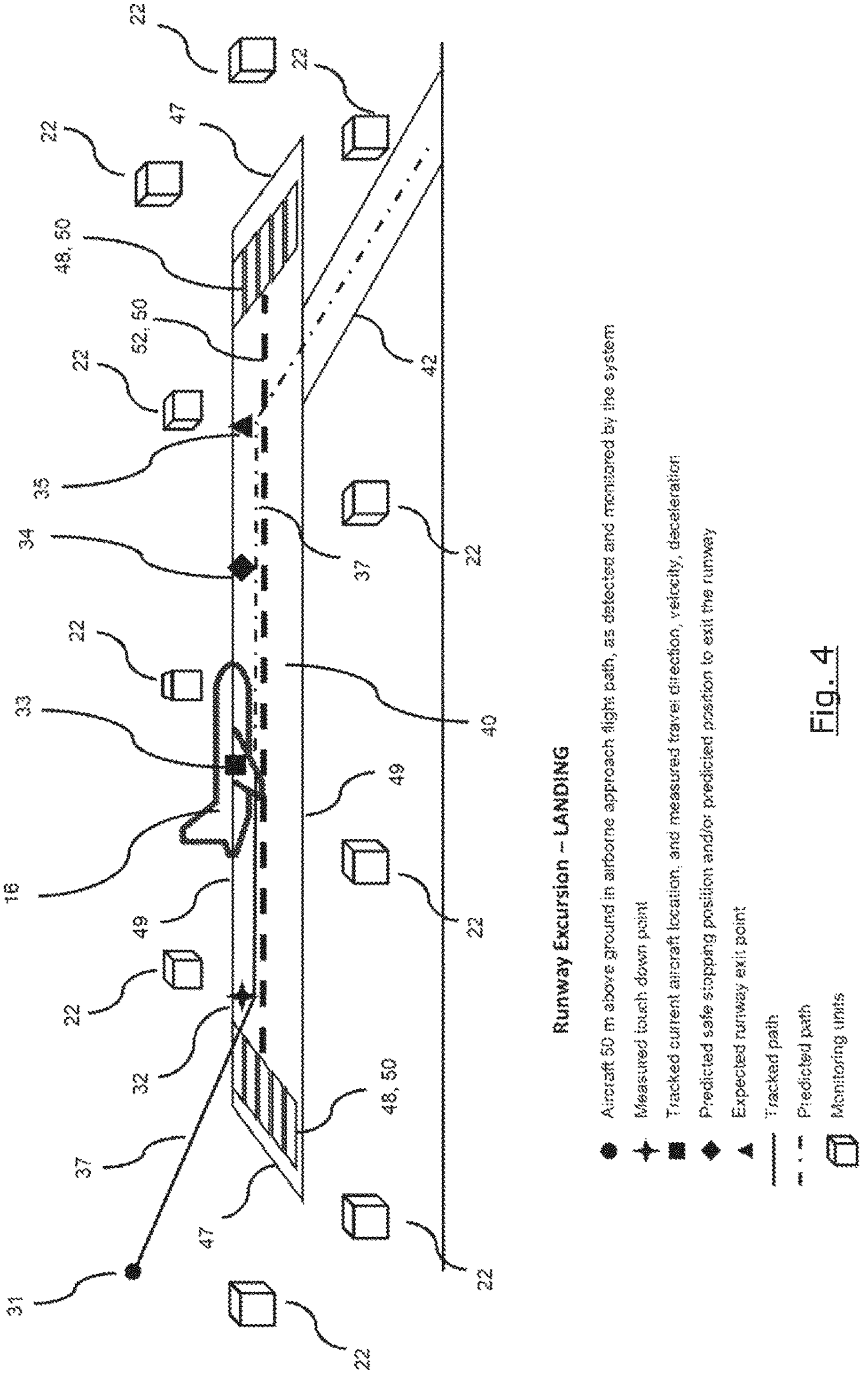
FIGS. 4 to 6 are schematic diagrams illustrating runway excursion on landing, runway excursion on take-off and runway excursion veer-off respectively as illustrated in the flowchart of FIG. 3.

Referring particularly to FIGS. 1, 2 and 4, there are provided about 10 or more monitoring units 22 which each include one of each of the least two sensors 26, 28, 30 and which are provided in multiple locations throughout the aviation environment near and at airport including runway, taxiway, apron, ramp areas, passenger boarding bridges, ground service vehicles, ground support vehicles, ground crew, airport building structures including gates. Monitoring units 22 are mounted on aircraft 16 and/or in locations on ground service vehicles and/or ground support vehicles 18 and equipment, ground personnel 20. Monitoring units 22 are configured and arranged so as to provide real-time, continuous and extensive views of a maximum space or volume near and at the airport (e.g. runway 40, taxiway 42, apron 44, ramp areas 46, runway threshold 48) in a variety of visibility or meteorological/environmental conditions. In particular the monitoring units 22 should also be configured to observe and monitor all, or a large proportion of, relevant aviation activities and operations near and at airport.

In a preferred embodiment, one of the at least two sensor types is a Light Detection and Ranging (whose acronym is LiDAR) 26. LiDAR sensors 26 are particularly advantageous in extracting accurate range information of objects in its field of view. In a more preferred embodiment, another of the at least two sensor types is a light detector such as a camera 28, such as colour or infrared cameras or similar which can provide information about the at least one object of interest and/or their surrounding environment which enables object classification and tracking. Most preferably, each monitoring unit 22 has one of each of the LiDAR sensor 26 and a camera-type sensor 28 thereby advantageously providing range information of one or more objects and surrounding environment by LiDAR sensor, allowing accurate motion and position measurement; and providing visual information of one or more objects and surrounding environment by both LiDAR and camera-types sensors but primarily by the camera-type sensor, which facilitates accurate, precise and reliable object classification/recognition. Further, the two sensor types 26, 28 work together to provide the information in both normal and challenging light conditions such as fog, low light, sun glare smoke-filled, and the like, within the sensor's field of view and preferably up to 250 m from the monitoring unit. In particular, the LiDAR sensor may be adapted to work in foggy or rainy conditions by using 1505 nm wavelengths at higher power and/or using a Frequency-Modulated Continuous Wave radar or Full Waveform radar. Other sensor types 30 may be provided in the monitoring unit 22 and/or information acquired using other sensor types may be provided for the purposes of enhancing the system 2 or providing redundancies. Information may include meteorological, surface movement (incl. runway, taxiway, apron), aircraft data. The sensor types may include A-DBS, surface movement radar.

TABLE 1

Pros and Cons of Example Sensor Information (including examples of preferred sensing properties)

| | Cameras | LiDAR |
|---|---|---|
| Pros | Real-time object detection<br>Multiple object classes, e.g. aircraft (complete aircraft, engine, landing gear), ground vehicle, ground crew<br>High detection rate and accuracy, both >95%<br>Simultaneous and 24/7 detection | High positioning accuracy <0.05 m<br>High spatial resolution at a distance of up to 250 m, preferred spatial resolution is <1.5 m<br>Range ~250 m<br>May be adapted to work in low visibility conditions, e.g. fog, heavy rainfall |

TABLE 1-continued

| Pros and Cons of Example Sensor Information (including examples of preferred sensing properties) | | |
|---|---|---|
| | Cameras | LiDAR |
| Cons | Relatively low object positioning accuracy, e.g. at a distance of 100 m, accuracy is ~2 m<br>Impacted by adverse light conditions, e.g. strong shaded area, sun glare, fog, rain | Low object recognition capability due to lack of visual detail and absence of colour<br>Object detection highly influenced by reflective area of the target objects |

The sensors/monitoring units 26, 28, 30, 22 are also capable of producing and transmitting information from multiple locations to processing system 4 which is configured to receive said to process the information associated with the aviation activities in the operating aviation environment, particularly near and at airports. Preferably, the information is transmitted to the processing system 4 in a secured manner.

The system 2 is configured to combine the information from the at least two types of sensors 26, 28, 30 acquired using at least one monitoring unit by associating the sensor information with time information, preferably by a processing system 4. The system 2 is also configured to combine the information from the at least two sensors 26, 28, 30 by associating the sensor information with spatial or distance or location information for example GPS coordinates or other positional information, range information and the like. The combination or 'fusing' of the sensor information with time information may be obtained by time synchronisation or temporal calibration, while the combination or 'fusing' of sensor information with spatial or distance or location information may be obtained by sensor calibration. At least one monitoring unit 22 can be employed to provide sensor information that can be fused into temporal and spatial data associated with objects in at least one predetermined location in the aviation environment, particularly near and at airports.

More than one monitoring unit 22 is employed in areas, such as runways 40, apron 44, ramp areas 46, to monitor the same predetermined location, where the multiple monitoring units 22 are spaced apart thereby allowing combination of multiple sensor information associated with multiple monitoring units which is temporally synchronised and spatially calibrated as illustrated in FIGS. 3 to 10. In particular, the system 4 employs more numerous monitoring units 22 per unit area where the aviation environment has a large number of objects and a large activity volume, which might have high potential aviation safety risks. Further details will be provided in the following paragraphs.

The processing system 4 is an artificial intelligence-based system which is configured to receive and process the sensor information to provide real-time sensing, recognition/classification and tracking of aircraft 16, ground personnel 20, ground vehicles 18 and other objects, recognition of operating environment, e.g. runway 40, taxiway 42, apron 44 and volume above these surfaces, and their features, e.g. runway boundary 49, marking 50, centreline 52, runway end 47, runway threshold 48, aircraft engine 51, aircraft landing gear 53, object motion and position estimation. The sensor information may be fused, i.e. temporally synchronised and/or spatially calibrated once received by the processing system 4 or alternatively it may be fused beforehand.

The terms "artificial intelligence" and "intelligent algorithms" are used herein to refer to and encompass systems of data processing and analysis that are conducted by computers capable of harvesting large amounts of possible input data, including images and other information from monitoring and sensing devices, that may be processed, analysed, and categorized based on a set of rules and then may be communicated so that appropriate action may be taken, whether automatically by a system receiving the processed and analysed data or manually by at least one human operator such as Air Traffic Control officer, pilot and emergency response team.

Referring to FIGS. 1 and 2, the processing system 4 is further configured to process the sensor information including the following example steps of a method 100 and data processing step 104 for safe operation assessment in an aviation environment which is summarised in Table 2, below.

TABLE 2

| Example Data Processing Stages |
|---|
| Stage 1: Data acquisition, preparation and fusion |

A. Sensor calibration
Extrinsic, intrinsic and distortion parameters of sensors, i.e. LiDAR and camera
This may include individual and/or cross calibration
Quantify sensor errors B. Time synchronisation
Between LiDAR and camera data acquired at various locations C. Data fusion
Project LiDAR data, i.e. point cloud, on image or vice versa
Data stitching between sensors data acquired at various locations for both LiDAR and camera, for example, LiDAR data stitching/registration using Iterative Closest Point (ICP), normal distributions transform (NDT), phase correlation, coherent point drift (CPD).

TABLE 2-continued

| Example Data Processing Stages |
| --- |
| Stage 2: Segmentation |
| A. Ground plane segmentation (LiDAR points)<br>Separate foreground (e.g. aircraft) and background (e.g. runway) objects using ground plane estimation<br>B. Cluster 3-D points (LiDAR points)<br>Apply output of Stage 3 Step A to output in Stage 2 Step A to form an object using a 3-D points grouping/clustering process |
| Stage 3: Object detection/Identification |
| A. Camera frames (2-D images)<br>Train, test, optimise and apply deep learning-based object detection models, e.g. You Only Look Once (YOLO), Fully Convolutional One-Stage (FCOS)<br>B. 3-D space (LiDAR points)<br>e.g. use spin image method for 3-D object recognition<br>e.g. use PointSeg network<br>C. Detection confidence score (2-D images and LiDAR points combined)<br>Integrate confidence score results from Steps 3.A and 3.B |
| Stage 4: Multiple Object Tracking and motion estimation |
| Associate moving objects in the current frame and the previous frame.<br>A. Camera frames (2-D images)<br>e.g. use Kalman filter method<br>B. 3-D space (LiDAR points)<br>e.g. use segment matching based method<br>e.g. joint probabilistic data association (JPDA) tracker |
| Stage 5: Safe operation assessment |
| Use data acquired and processed from Stages 1 to 4, measure, calculate and predict:<br>moving object's position, travel direction, velocity, acceleration<br>distance between aircraft of interest and object of interest, e.g. runway centreline, boundary, other aircraft<br>Assess/calculate, and predict/determine/decide & generate alert when deviation from and/or violation of safety operation criteria is detected. |

With reference to Table 2 and FIG. 2, the information/data is received from the at least two sensors 26, 28, 30 or at least one monitoring unit 22 in step 102 and is prepared for being received by the processing system 4 in step 104. Next, in step 104 generally speaking, the processing system 4 processes the sensor information.

In this particular example, see step 104 exemplified by table 2, the system 4 is configured to receive sensor information from the camera 28 and LiDAR 26 and to combine the two type of sensors' information by data fusion methods, including by sensor calibration and/or time-syncing.

Preferably, the data fusion, and preparation of the data therefor, includes acquisition of extrinsic, intrinsic and distortion parameters of sensors (i.e. LiDAR and camera), followed by quantification of sensor errors.

Preferably, time synchronisation may be achieved through the use of internal/external timer source(s) that are coupled to with the sensors, and the read and comparison of timestamps that are associated with individual image and point cloud data using the processing system.

Preferably, the LiDAR information, a 3-D point cloud of the objects within the aviation environment, is projected on the camera image or vice versa.

Preferably, the LiDAR information, acquired from multiple LiDAR sensors that are located at various locations, is registered/stitched/fused using algorithms such as Iterative Closest Point (ICP), normal-distributions transform (NDT), phase correlation, coherent point drift (CPD).

Preferably, the image information, acquired from multiple cameras that are located at various locations, is registered/stitched/fused using algorithms such as feature based image registration. The abovementioned operations may be incorporated in alternative examples or embodiments of the present invention.

It will be understood that the person skilled in the art would be able to conduct data fusion (e.g. sensor calibration, time-syncing) by a variety of methods or algorithms.

In the next step 'Stage 2' in the example described in Table 2, the system 2, and more preferably the processing system 4, is configured to process the sensor information to separate the foreground from the background via ground plane segmentation process(es). In this example, 3-D LiDAR point cloud obtained in the previous steps is used to separate foreground objects, such as aircraft or support ground-based vehicles, from background objects i.e. runway. In particular, the processing system 4 can perform the separation or ground plane segmentation by techniques such as ground plane estimation, however it is expected that other known techniques could be utilised.

Next the processing system 4 is then configured to form at least one object from 3-D LiDAR point cloud. In this example, the 3-D point cloud object is formed by the result of the combination of received outputs produced by separation of the foreground and background in the previous step (Stage 2 Step A in Table 2) and object detected and classified from the camera image which is processed in the Stage 3 Step A in Table 2. Preferably the object formed by combination is formed by a 3-D points grouping or clustering process thereby forming a 3-D space although it would be understood that other processes or techniques could be equally employed. The Stage 3 Step A, camera image processing step, is independently processed to the Stage 2 steps and therefore can be performed temporally before or in parallel with Stage 2 Step A such that the results of Stage 3 Step A is available and ready for use before the commencement of Stage 2 Step B. Results of Stage 3 Step A is an input to Stage 2 Step B.

In the next processing step, Stage 3, as illustrated in Table 2, the processing system 4 is configured to detect and/or identify and classify objects in the aviation environment. In the example 'Stage 3' summarised in Table 2, the processing system 4 can first process the camera sensor information received from the camera images/video frames to detect and/or identify the objects. In particular, the artificial intelligence-based data processing system 4 employs machine- or deep-learning-based object detection and/or classification models, which are trained, validated, verified and optimised for detection and classification of objects involved in aviation activities in an aviation environment near and at airport. The object detection and/or classification models that can be utilised include You Only Look Once (YOLO) or Fully Convolutional One-Stage (FCOS) models although it is expected that other artificial intelligence-based models could equally be used instead for similar effect.

In data processing Stage 2 Step B, the processing system 4 can also process the LiDAR sensor information which has been processed to form a cluster 3-D points in Stage 2 Step B, for object identification and/or recognition. Example techniques for the 3-D object recognition in the 3-D space can include the spin image method or the PointSeg network although other known methods could be utilised.

In the next processing step, Stage 3 Step C, the processing system 4 can then combine the processed camera sensor information and processed LiDAR sensor information which can result in a detection confidence score which can be associated with the sensor information. The use of detection confidence score enhances the detection and classification accuracy by reducing false detections and by increasing detection rate. For example, for reducing false detection, there are two aircraft have similar configurations and features but are different in size, i.e. both are configured with a cylindrical fuselage with two jet engines, and one aircraft is 30 metres long whereas another aircraft is 60 metre long. If the larger aircraft is located closer than the smaller aircraft to the camera, information acquired from the camera and subsequently processed by the processing system might not be able to accurately differentiate the size difference between the two aircraft. The information about these two aircraft acquired from LiDAR, on the other hand, can provide accurate size information and location information of these two different types of aircraft regardless of the difference in distance between the aircraft and the LiDAR sensor. For example, for increasing detection rate, while LiDAR information provides high positioning accuracy of 0.05 metres, the spatial resolution of 1.5 meters at a distance of 200 metres may be sufficient to detect and identify an aircraft with a length of 30 metres, but it may not be able to detect and identify objects with dimensions below 1.5 metres such as some ground equipment, e.g. tow bar 45, ground crew, cargo/baggage cart. By combining these two types of information acquired with camera and LiDAR sensors, the detection and classification accuracy may therefore be enhanced by reducing the effects of lack of range information from camera information and by reducing the effects of lack of visual detail and absence of colour from 3-D LiDAR point cloud.

Once the system 2 has detected, identified and/or classified the objects in the aviation environment near and at airports, the system 2 is then configured to associate the motion of at least one object, preferably multiple objects, over time as exemplified in the example Stage 4 of Table 2. Further the system 2 is also configured to provide an estimation of the motion of the object(s). For the purposes of object tracking and motion estimation, the system 2 is configured to associate moving objects in one information acquisition and at least one other subsequent information acquisition. One information acquisition refers to one camera/video frame and one LiDAR frame or its equivalent, which are temporally-synchronised and spatially calibrated. The system 2, particularly the processing system 4, is configured to process the sensor information from the 2-D camera/video images and/or the LiDAR point clouds from the 3-D space to associate sensor information from each sensor from one information acquisition (i.e. camera/video frame and/or LiDAR point clouds) to a subsequent or previous information acquisition. Preferably, the processing system 4 is able to process sensor information associated with at least two sequential camera/video frames at a particular moment when information acquisitions are received by the data processing system 4 continuously over time. In a particularly preferred embodiment, the processing system 4 employs the Kalman filter method to process the 2-D camera/video images, and the segment matching based method or joint probabilistic data association (JPDA) tracker to process the 3-D space data (LiDAR point clouds). It would be understood however that other models or methods to predict the physical properties of the objects' predicted physical properties could be substituted for the ones named above.

In a final processing stage (stage 5 of the example processing method in Table 2), the system 2 is configured to combine the outputs of the processed sensor information from the previous steps/stages to measure, calculate and provide an output of the estimation or prediction of one or more objects' physical properties such as position, acceleration, speed and/or travel direction of any object(s) motion. Furthermore, the system 2 is configured to compare one predicted object's physical properties to another, for example a distance or predicted distance between aircraft 16 and another object of interest, i.e. runway centreline 52, boundary 49, runway threshold 48, other aircraft 16, and to output information which is associated with these properties of the compared objects. The system 2 is able to assess the properties of the compared objects with predetermined safe operation criteria and to generate an alert (in step 106, see FIG. 2) when the system 2 has determined that the predetermined safe operation criteria may or has been violated or otherwise deviated therefrom, and to provide suggested corrective or evasive actions to a number of users in the aviation environment, particularly near and at airports.

Although the examples described herein refer to an aviation environment, particularly near and at airports, the system 2 can be utilised in a number of other environments requiring monitoring of multiple moving and static objects within an environment such as industrial environments, such as maritime operations, road/autonomous driving operations, mining operations, industrial plants, logistics centres, manufacturing factories, aviation operations that are not near and at airports, space operations and the like.

Details of the various predetermined safe operation criteria are provided in the following paragraphs and in particular from Tables 3 and 4.

TABLE 3

Example of occurrence types, Detection and Tracking Multiple Objects data processing capability and Safe Operation Criteria.

| Functions/Occurrence Types | Detection and Tracking Multiple Objects (DATMO) Capability Safe Operation Criteria |
|---|---|
| RUNWAY<br>A1. Runway excursion<br>A2. Runway incursion<br>A3. Runway undershoots<br>A4. Rejected take-off<br>A5. Depart/Approach/ Land Wrong Runway<br>A6. Missed approach/ go-around<br>A7. Runway events - Other | Object detection<br>Moving object: aircraft, ground vehicle, ground crew<br>Static object: runway, taxiway, apron (surface, markings, boundary, centreline)<br>Object classification: aircraft type, airline<br>Object tracking: aircraft, ground vehicle, ground crew<br>Measure, calculate and predict:<br>Moving object's position, travel direction, velocity, acceleration, altitude and attitude (if airborne)<br>Distance between aircraft of interest and object of interest, e.g. runway centreline, boundary, other aircraft<br>Coverage: On and near runway (e.g. a volume 200 m higher and 500 m wider than runway surface), taxiways and apron/stand/gate<br>Calculate, and predict/determine/decide & alter:<br>Runway distance remaining & likelihood of runway excursion and rejected take-off<br>Unauthorized entry of aircraft, ground vehicle and crew, vehicle & likelihood of runway incursion<br>On approach, aircraft altitude (above ground), vertical speed, distance between aircraft and runway boundary, and deviation from desired approach profile & likelihood of runway undershoot<br>After take-off or on approach, compare actual flight path with designated/expected flight path & likelihood of depart/approach/ land wrong runway, missed approach/go-around |
| GROUND OPERATIONS<br>B1. Foreign object damage/debris<br>B2. Objects falling from aircraft<br>B3. Taxiing collision/Near collision<br>B4. Jet blast/Prop/Rotor wash<br>B5. Ground handling<br>B6. Ground operations - Other<br>B7. Interference with aircraft from ground<br>B8. Dangerous goods<br>B9. Loading related<br>B10. Aircraft loading - Other<br>B11. Fuel leaking of venting<br>B12. Auxiliary power unit<br>B13. Engine failure or malfunction<br>B14. Fuselage/Wings/ Empennage<br>B15. Anti-ice protection<br>B16. Security related | Object detection<br>Moving object: aircraft, ground vehicle, ground crew/person, cargo, fuel<br>Static object: runway, taxiway, apron (surface, markings, boundary, centreline), cargo, fuel, foreign object/debris/aircraft parts<br>Aircraft features: engine, propeller, rotor, auxiliary power unit, fuel, damage, ice<br>Object classification: aircraft type, airline, foreign object/debris/ aircraft parts<br>Object tracking: aircraft, ground vehicle, ground crew, cargo<br>Measure, calculate and predict<br>Moving object's position, travel direction, velocity, acceleration, altitude and attitude (if airborne)<br>Distance between aircraft of interest and object of interest, e.g. runway and taxiway surface, markings, centreline, boundary, other aircraft, ground vehicle, ground crew<br>Coverage: On and near runway (e.g. a volume 200 m higher and 500 m wider than runway surface), taxiways and apron/stand/gate<br>Calculate, and predict/determine/decide & alter<br>Foreign object, debris, aircraft parts and likelihood of foreign object damage/debris, objects falling from aircraft<br>Position, distance, velocity and acceleration, and travel direction between aircraft and object of interest (aircraft, ground vehicle, ground crew, infrastructure) & likelihood of collision, ground handling, loading related, interference with aircraft from ground occurrences<br>Distance between aircraft engine/propeller/rotor and object of interest (aircraft, ground vehicle, ground crew, infrastructure) & likelihood of jet blast/prop/rotor wash<br>Detect and monitor likelihood of fuel leaking or venting, dangerous goods, auxiliary power unit, aircraft damage, engine failure or malfunction, ice on aircraft, security related occurrence |
| AIRCRAFT CONTROL<br>C1. Hard landing<br>C2. Ground strike<br>C3 Wire strike<br>C4. Loss of control<br>C5. Unstable approach<br>C6. Wheels up landing<br>C7. Landing gear/ Indication<br>C8. Incorrect configuration<br>C9. Ground proximity alerts/ warnings | Object detection<br>Moving object: aircraft, ground vehicle, ground crew<br>Static object: runway, taxiway, apron (surface, markings, boundary, centreline)<br>Aircraft features: flap, landing gear<br>Object classification: aircraft type, airline<br>Object tracking: aircraft, ground vehicle, ground crew<br>Measure, calculate and predict<br>Moving object's position, travel direction, velocity, acceleration, altitude and attitude (if airborne)<br>Distance between aircraft of interest and object of interest, e.g. runway centreline, boundary, other aircraft<br>Coverage: On and near runway (e.g. a volume 400 m higher and 5000 m longer than runway surface)<br>Calculate, and predict/determine/decide & alter<br>On approach, aircraft vertical deceleration exceeds the limit set in the aircraft's operations manual or damage occurs during the |

TABLE 3-continued

Example of occurrence types, Detection and Tracking Multiple Objects data processing capability and Safe Operation Criteria.

| Functions/Occurrence Types | Detection and Tracking Multiple Objects (DATMO) Capability Safe Operation Criteria |
|---|---|
| C10. Flight below LSALT<br>C11. Lost/unsure of position<br>C12. Collision with terrain (near and at airport)<br>C13. Collision/Near collision (near and at runway)<br>C14. Controlled flight into terrain (CFIT)<br>C15. Loss of separation<br>C16. Loss of separation assurance (LOSA)<br>C17. Aircraft separation - issues<br>C18. Airspace infringement<br>C19. Operational non-compliance<br>C20. Airspace - other | landing & likelihood of hard landing<br>On approach, distance between aircraft fuselage and runway surface, fumes or spark due to contact between aircraft and ground surface & likelihood of ground strike<br>After take-off or on approach, compare actual flight path with designated/expected flight path & likelihood of ground proximity, loss of separation, collision (near and at runway), loss of control, flight below LSALT, lost/unsure of position, wire strike, controlled flight into terrain, airspace infringement, failure to pass traffic, information/procedural error, ANSP operational error - other, operational non-compliance, airspace - other<br>On approach, aircraft's deviation from the aircraft approach profile parameters stipulated in a company's standard operating procedures (SOPs) & likelihood of unstable approach<br>On approach, whether the aircraft has timely and correctly lowered landing gear and configured flap & likelihood of wheels up landing, landing gear/indication, incorrect configuration |
| ENVIRONMENT<br>D1. Animal strike<br>D2. Bird strike<br>D3. Wildlife - Other<br>D4. Near encounter with remotely piloted aircraft<br>D5. Turbulence/windshear/microburst<br>D6. Unforecast weather<br>D7. Emergency evacuation<br>D8. Fire<br>D9. Fumes<br>D10. Smoke<br>D11. Icing<br>D12. Lightning strike | Object detection<br>Moving object: aircraft, ground vehicle, ground crew, wildlife, remotely piloted aircraft<br>Static object: runway, taxiway, apron (surface, markings, boundary, centreline, lighting), wildlife, remotely piloted aircraft<br>Aircraft features: falling parts, aircraft damage, fire, fume, smoke, icing<br>Object classification: aircraft type, airline, wildlife, remotely piloted aircraft<br>Object tracking: aircraft, ground vehicle, ground crew<br>Measure, calculate and predict<br>Moving object's position, travel direction, velocity, acceleration, altitude and attitude (if airborne)<br>Distance between aircraft of interest and object of interest, e.g. remotely piloted aircraft, wildlife, foreign object/debris/aircraft parts<br>Coverage: On and near runway (e.g. a volume 400 m higher and 5000 m longer than runway surface), taxiways and apron/stand/gate<br>Calculate, and predict/determine/decide & alter<br>Wildlife, remotely piloted aircraft & likelihood of animal strike, bird strike, wildlife - other, near encounter with remotely piloted aircraft<br>Turbulence/windshear/microburst, unforecast weather and likelihood of turbulence/windshear/microburst, unforecast weather<br>Likelihood of emergency evacuation<br>Fire, fume, smoke & likelihood fire, fume, smoke, icing or lightning strike |
| INFRASTRUCTURE<br>E1. Rada/surveillance<br>E2. Runway lighting<br>E3. Infrastructure - other | Object detection<br>Moving object: aircraft, ground vehicle, ground crew<br>Static object: runway, taxiway, apron (surface, markings, boundary, centreline), and infrastructures<br>Aircraft and environment features: fire, fume, smoke<br>Infrastructure may include, one or more buildings, gates, hangars, light polls, and/or fences<br>Object classification: aircraft type, airline, fire, fume, smoke<br>Object tracking: aircraft, ground vehicle, ground crew<br>Measure, calculate and predict<br>Moving object's position, travel direction, velocity, acceleration, altitude and attitude (if airborne)<br>Distance between aircraft of interest and object of interest, e.g. fire, fume, smoke<br>Coverage: On and near runway (e.g. a volume 400 m higher and 5000 m longer than runway surface), taxiways and apron/stand/gate<br>Calculate, and predict/determine/decide & alter:<br>Any faults or deficiencies associated with radar/surveillance, runway lighting, other infrastructure & likelihood of radar/surveillance, runway lighting and other infrastructure occurrences |

TABLE 4

Example safe/unsafe operation criteria and assessment method.

| Safe/unsafe operation criteria | Safe operation assessment method |
|---|---|
| A1. Runway excursion<br>An aircraft that veers off the side of the runway or overruns the runway threshold. Excursion occurrences occur during take-off or landing only, and may be either intentional or unintentional.<br>A1.1. Veer off side of runway<br>Deviation (i.e. distance) of aircraft from the centreline of the runway should not be significant, e.g. for a runway with a width of 60 meters and an aircraft with a wing span of 60 meters, the centreline of the aircraft should not deviate more than 15 meters from runway centreline.<br>Distance between aircraft landing gear and runway side boundary should not be significant, e.g. for a runway with a width of 60 meters and an aircraft with a wing span of 60 meters, the distance between aircraft landing gear and runway side boundary should not be less than 15 meters.<br>A1.2. Overrun runway threshold<br>Aircraft should not overrun runway threshold.<br>During take-off, aircraft should accelerate to become airborne before overruns threshold, e.g. for a runway with a length of 3000 meters, under certain weather and runway surface conditions, for a particular aircraft type and weight, the predicted lift off position is 1600 meters from start position with a lift off speed (VLOF) of 120 knots, and runway distance remaining should be 1400 meters.<br>During landing, after touching down, aircraft speed should become low enough to ensure a safe stop before the end of the runway and/or aircraft can safety exit runway. | A1.1. Veer off side of runway<br>Predict likelihood of runway excursion by monitoring deviation of aircraft track from runway centreline, i.e. tendency to deviate from runway centreline.<br>Predict likelihood of runway excursion by monitoring distance between aircraft landing gears/fuselage/wingtip and runway side boundary.<br>A.1.2. Overrun runway threshold<br>Monitor aircraft position and motion (e.g. travel direction, velocity and acceleration) on runway.<br>Monitor distance between aircraft and runway threshold, i.e. runway distance remaining.<br>Predict likelihood of runway excursion by calculating lift-off position (take-off case) or position that ground speed is lowered to a certain value (landing case) based on runway distance remaining, and present and predicted aircraft motion.<br>Calculations should also be based on aircraft breaking capability (e.g. specific aircraft type's spoiler, tyre break, engine anti-thruster performances) and runway conditions (e.g. dry, wet, surface material type) and other contributing factors.<br>Alerts<br>If likelihood of runway excursion within next 20 seconds is high and persist for more than 2 seconds, generate alerts. |
| A2. Runway incursion<br>The incorrect presence of an aircraft, vehicle or person on the protected area of a surface designated for the landing and take-off of aircraft.<br>anything within the confines of the runway strip, irrespective of having an appropriate clearance, which hinders the operation of an arriving or departing aircraft; or an aircraft, vehicle or person entering the confines of the flight strip without a clearance to do so, regardless of other aircraft operations. | Detect and track aircraft, vehicle or person on the protected area of a surface designated for the landing and take-off of aircraft.<br>Predict likelihood of runway incursion by checking authorisation for detected aircraft, vehicle or person.<br>Alerts<br>If likelihood of runway incursion within next 20 seconds is high and persists for more than 2 seconds, generate alerts. |
| A3. Runway undershoots<br>Any aircraft attempting a landing and touches down prior to the threshold. Any occurrence where an aircraft touches down short of the approved designated landing area of the runway - generally relates to a misjudgement by a pilot during the approach phase. For example, aircraft that come into contact with vegetation or a fixed object (fence line, powerline, etc). and continues the approach. | Monitor aircraft flight path on approach, e.g. lateral and vertical profile, airspeed and bank angle, altitude, vertical speed.<br>Predict likelihood of runway undershoots by calculating touch down point/impact point based on present and predicted aircraft flight path on approach.<br>Alerts<br>If likelihood of runway undershoots within next 20 seconds is high and persists for more than 2 seconds, generate alerts. |

TABLE 4-continued

Example safe/unsafe operation criteria and assessment method.

| Safe/unsafe operation criteria | Safe operation assessment method |
|---|---|
| A4. Rejected take-off<br>Any circumstance by which aircraft discontinues the take-off after commencement of the take-off roll. The situation which follows when it is decided to stop an aircraft during the take off roll and may be initiated by flight crew or air traffic control officer.<br>For example, an aircraft should discontinue the take-off roll if any circumstance that may endanger aviation safety is identified, e.g. engine malfunction/failure, runway incursion. | Monitor aircraft take off performance, including aircraft motion along runway (e.g. velocity, acceleration), aircraft configuration (e.g. flap, wing surface de-ice), aircraft damage (e.g. engine, fuselage), runway conditions (e.g. unauthorised aircraft/ground/vehicle/person, foreign object damage/debris, surface conditions), etc.<br>Predict likelihood of rejected take-off by monitoring aircraft take off performance based on aircraft motion, aircraft configuration, aircraft damage and runway conditions.<br>Alerts<br>If likelihood of rejected take-off within next 20 seconds is high and persists for more than 2 seconds, generate alerts |
| A5. Depart/Approach/Land Wrong Runway<br>Depart/Approach/land wrong runway includes occurrences where a pilot unintentionally:<br>approaches, takes off from, or lands on a runway other than that intended or authorised by air traffic control officer<br>approaches, takes off from, or lands on a closed runway<br>approaches, takes off from, or lands on a taxiway<br>approaches and/or lands on a roadway in the vicinity of an aerodrome | Monitor track (ground movement, flight path) of an aircraft during takes off, landing, attempts to land from final approach, operates in the circuit.<br>Predict likelihood of Depart/Approach/Land Wrong Runway by assessing deviation of monitored track from intended or authorised track.<br>Alerts<br>If likelihood of Depart/Approach/Land Wrong Runway within next 20 seconds is high and persists for more than 2 seconds, generate alerts. |
| A6. Missed approach/go-around<br>Any circumstance in which the aircraft discontinues its approach to land. A missed approach procedure is the procedure to be followed if an approach can no longer be continued based on the flight crew or air traffic control officer assessment that the approach has been compromised. The missed approach procedure takes into account de-confliction from ground obstacles and from other air traffic flying instrument procedures in the airfield vicinity.<br>Reasons for discontinuing an approach include the following:<br>required visual references have not been established by Decision Altitude/Height (DA/H) or Minimum Descent Altitude/Height (MDA/H) or is acquired but is subsequently lost<br>approach is, or has become unstabilised<br>aircraft is not positioned so as to allow a controlled touch down within the designated runway touchdown zone with a consequent risk of aircraft damage with or without a 'Runway Excursion' if the attempt is continued<br>runway is obstructed, e.g. ground obstacles and from other air traffic flying instrument procedures in the airfield vicinity<br>a landing clearance has not been received or is issued and later cancelled | Monitor aircraft activities on approach that might stipulate a missed approach procedure.<br>Predict likelihood of a missed approach procedure should be carried out.<br>Alerts<br>If likelihood of missed approach/go-around should be carried out within next 20 seconds is high and persists for more than 2 seconds, generate alerts. |
| A7. Runway events - Other<br>Runway event occurrences not specifically covered elsewhere. Runway hazards do not belong to Al-A6. Add and assess in accordance with local operating conditions. | Monitor runway, taxiway, apron, ramp areas.<br>Monitor moving and static objects (aircraft/terrain/ground vehicle/person/object/terrain). |
| B1. Foreign object damage/debris<br>Any loose objects on an aerodrome or in an aircraft that have caused, or have the potential to cause, damage to an aircraft.<br>The operation of an aircraft has been affected - i.e. causes damage, aircraft passes over object, rejected take off or missed approach. | Detect and monitor foreign object, debris or any loose objects on aerodrome or in an aircraft.<br>Monitor distance between aircraft and foreign object, debris or any loose objects.<br>Predict likelihood of foreign object, debris or any loose objects adversely affecting on the operating aircraft.<br>Alerts<br>If likelihood of foreign object damage/debris is high and persists for more than 5 seconds, generate alerts. |

TABLE 4-continued

Example safe/unsafe operation criteria and assessment method.

| Safe/unsafe operation criteria | Safe operation assessment method |
|---|---|
| B2. Objects falling from aircraft<br>The 'unintentional' loss of an aircraft component or object inside or on the aircraft that falls to the ground or detaches from the aircraft during normal flight operations. This includes:<br>aerials<br>lights<br>panels<br>external loads (helicopter)<br>wheels | Detect and monitor objects falling from aircraft.<br>Monitor distance between aircraft and objects falling from aircraft.<br>Predict effects of objects falling from aircraft on operating aircraft at airport.<br>Alerts<br>If objects falling from aircraft is adversely affecting operating aircraft near and at airport, generate alerts.<br>If objects falling from aircraft is detected, inform relevant stakeholder, airport engineering team, to inspect/remove. |
| B3. Taxiing collision/Near collision<br>An aircraft collides, or has a near collision, with another aircraft, terrain, person, ground vehicle or object on the ground or on water during taxi.<br>An aircraft collides, or has a near collision, with another aircraft, terrain, person, ground vehicle or object on the ground or on water during taxi. | Monitor aircraft tracks, and its distance to other aircraft/terrain/ground vehicle/person/object.<br>Monitor awareness of one aircraft to the other aircraft/terrain/ground vehicle/person/object, avoiding plan and/or action.<br>Monitor damage to the fuselage, wings, or empennage<br>Predict likelihood of collision by monitoring distance between aircraft and other aircraft/terrain/ground vehicle/person/object and present and predicted aircraft tracks (e.g. path, travel direction, velocity).<br>Alerts<br>If likelihood of collision within next 20 seconds is high and persists for more than 2 seconds, generate alerts. |
| B4. Jet blast/Prop/Rotor wash<br>Any air disturbance from a ground-running aircraft propeller, rotor or jet engine that has caused, or has the potential to cause, injury or damage to property.<br>Any air disturbance from a ground-running aircraft propeller, rotor or jet engine should not cause, or has the potential to cause, injury or damage to property (e.g. other aircraft/terrain/ground vehicle/object) or person. | Monitor ground-running aircraft propeller, rotor or jet engine.<br>Monitor other aircraft/terrain/ground vehicle/object/person near the ground-running aircraft propeller, rotor or jet engine.<br>Monitor distance between ground-running aircraft propeller, rotor or jet engine and other aircraft/terrain/ground vehicle/object/person.<br>Predict likelihood of jet blast/prop/rotor wash by monitoring distance between aircraft and other aircraft/terrain/ground vehicle/person/object, and present and predicted aircraft tracks.<br>Alerts<br>If likelihood of jet blast/prop/rotor wash within next 20 seconds is high and persists for more than 2 seconds, generate alerts. |
| B5. Ground handling<br>Any ground handling and aircraft servicing that caused, or has the potential to cause injury or damage to a stationary aircraft.<br>Ground handling relate specifically to ramp operations - i.e. engineering, aircraft loading, catering and refueling services, etc. This can take place on the land or water, and include operations on ships, oil rigs, and similar platforms. This includes:<br>vehicles colliding with a stationary aircraft<br>fuel spillages<br>pushback procedures or other engineering related occurrence | Monitor ground handling and aircraft servicing by detecting, tracking and monitoring aircraft, vehicles, persons, equipment.<br>Monitor compliance of ground handling and aircraft servicing with defined procedures, e.g. fuel spillage, ramp operations - i.e. engineering, aircraft loading, catering and refuelling services, pushback procedures or other engineering related occurrence.<br>Monitor distance between aircraft, vehicles, persons, equipment, e.g. vehicles colliding with a stationary aircraft.<br>Predict likelihood of ground handling by monitoring distance between aircraft, vehicles, persons, equipment, and present and predicted tracks, and compliance with defined procedures.<br>Alerts<br>If likelihood of ground handling within next 20 seconds is high and persists for more than 2 seconds, generate alerts. |
| B6. Ground operations - Other<br>Ground operation occurrences not specifically covered elsewhere.<br>Runway hazards do not belong to B1-B5.<br>Add and assess in accordance with local operating conditions. | Monitor runway, taxiway, apron, ramp areas.<br>Monitor moving and static objects (aircraft/terrain/ground vehicle/person/object/terrain). |

TABLE 4-continued

Example safe/unsafe operation criteria and assessment method.

| Safe/unsafe operation criteria | Safe operation assessment method |
|---|---|
| B7. Interference with aircraft from ground<br><br>Any ground based activity that interferes with the operation of an aircraft. Ground based interference occurrence types:<br>laser/Spotlight<br>model aircraft<br>radio frequency interference<br>weather balloons<br>yacht masts | Detect and monitor interference sources near and at airport.<br>Predict likelihood of interference to aircraft from ground based on distance/proximity between aircraft and interference source(s) near and at airport, and effects of interference(s).<br>Alerts<br>If likelihood of interference to aircraft from ground within next 20 seconds is high and persists for more than 5 seconds, generate alerts. |
| B8. Dangerous goods<br>The carriage of dangerous goods in contravention of Commonwealth, State or Territory law.<br>Dangerous goods occurrences include situations in which:<br>undeclared dangerous goods are discovered<br>dangerous goods have spilled<br>dangerous goods are incorrectly packed or stowed<br>B9. Loading related<br>The incorrect loading of an aircraft that has the potential to adversely affect any of the following: the aircraft's weight; balance; structural integrity; performance; flight characteristics.<br>Freight issues occurrences include: incorrect load sheets; freight shifting in flight; unrestrained or inadequately restrained freight; spillages in a freight hold (other than dangerous goods); an incorrectly trimmed aircraft; weight & balance issues<br>B10. Aircraft loading - Other<br>Aircraft loading occurrences not specifically covered elsewhere that do not belong to B8-B9.<br>Add and assess in accordance with local operating conditions. | Monitor and classify goods, including undeclared dangerous goods.<br>Monitor and detect spills, incorrect packing/stowing.<br>Monitor and detect aircraft trimming and weight and balance issues<br>Predict likelihood of dangerous goods and loading related occurrences by monitoring goods, loading procedures, spills, etc.<br>Alerts<br>If likelihood of dangerous goods and loading related occurrences is high and persists for more than 2 seconds, generate alerts. |
| B11. Fuel leaking of venting<br>Relates specifically to the unplanned loss of fuel from a fuel tank or fuel system. | Similar to B1, B2, E2 |
| B12. Auxiliary power unit<br>Any mechanical failure of the APU i.e. APU fires, fumes and smoke events where the APU was identified as the source<br>B13. Engine failure or malfunction<br>An engine malfunction that results in a total engine failure, a loss of engine power or is rough running includes:<br>Engine fires, fumes and smokes where the engine was identified as the source<br>A rough running engine (coughing, spluttering, etc) | Similar to D8, D9, D10 |
| B14. Fuselage/Wings/Empennage<br>Damage to the fuselage, wings, or empennage not caused through collision or ground contact. Any damage to the fuselage, wings, or empennage that involve: cracks, creases, dents<br>B15 Anti-ice occurrence types include: pitot heat, deice boots, carburettor heat, nacelle/engine anti-ice<br>B16. Security related<br>When aviation security has been, or is likely to have been, compromised includes situations involving:<br>weapons or prohibited items being taken onto an aircraft.<br>the discovery of unidentified or suspicious objects on an aircraft.<br>attempted unlawful interference, such as sabotage, hijack, vandalism etc.<br>unapproved airside entry of persons or vehicles | Similar to B1, B2, E2<br>Security related incidents on their own are to be recorded as an 'Event'. A scheduled report of all reported security related matters are sent to The Office of Transport Security on a weekly basis. |

TABLE 4-continued

Example safe/unsafe operation criteria and assessment method.

| Safe/unsafe operation criteria | Safe operation assessment method |
| --- | --- |
| C1. Hard landing The vertical deceleration limit for the aircraft set out in the aircraft's operations manual is exceeded or damage occurs during the landing.<br>The vertical deceleration limit for the aircraft set out in the aircraft's operations manual should not be exceeded and/or damage should not occur during the landing. | On approach, monitor and calculate aircraft vertical deceleration<br>Monitor damage occurs during the landing<br>Predict likelihood of hard landing by comparing monitored and calculated aircraft vertical deceleration with the limit set in the aircraft's operations manual<br>Alerts<br>If likelihood of hard landing within next 20 seconds prior to touch down is high and persists for more than 2 seconds, generate alerts. |
| C2 Ground strike<br>When part of the aircraft drags on, or strikes, the ground or water. Ground strike includes situations where an aircraft is in the take-off or landing phase a (including a hover taxi for helicopters) in which:<br>a rotor or propeller makes contact with the ground<br>an engine pod, wingtip, or tail contacts the ground<br>C3. Wire strike<br>When an aircraft strikes a wire, such as a powerline, telephone wire, or guy wire, during normal operations. C3's criteria is similar to C2's | Monitor distance/clearance between aircraft (e.g. rotor, propeller, engine pod, wingtip, tail) and ground or water/wire.<br>Predict likelihood of ground strike by monitoring distance/clearance between aircraft and ground or water/wire and comparing that value with a defined/recommended safe distance.<br>Alerts<br>If likelihood of ground/wire strike within next 20 seconds is high and persists for more than 2 seconds, generate alerts. |
| C4. Loss of control<br>When control of the aircraft is lost or there are significant difficulties controlling the aircraft either airborne or on the ground.<br>Loss of control occurrences include:<br>an unintentional ground loop of an aircraft1<br>unintentional departure from normal flight necessitating recovery action or resulting in a terrain collision<br>helicopter dynamic rollover | Monitor and track aircraft path on ground and airborne near and at airport.<br>Predict likelihood of a loss of control occurrence based on extent of deviation of present and predicted path from normal path.<br>Alerts<br>If likelihood of loss of control within next 20 seconds is high and persists for more than 2 seconds, generate alerts. |
| C5. Unstable approach<br>A continued approach and/or landing in contravention of the operator SOP relating to their 'stable approach' criteria.<br>An aircraft should not continue to land from an approach where there is sufficient evidence of a significant deviation from the aircraft approach profile parameters stipulated in a company's standard operating procedures (SOPs). | As a general guide, when an aircraft is on approach and within 1,000 feet above the aerodrome, monitor<br>track/localiser deviation<br>descent rate<br>altitude<br>bank angle<br>alignment with runway centreline<br>flight path/glideslope angle<br>airspeed<br>landing configuration<br>predicted touch down point<br>Predict likelihood of an unstable approach based on extent of deviation of present and predicted approach profile from stable approach profile defined in SOP.<br>Alerts<br>If likelihood of unstable approach within next 20 seconds is high and persists for more than 5 seconds, generate alerts. |
| C6. Wheels up landing<br>An aircraft contacts the intended landing area with the landing gear retracted. A wheels-up landing relates specifically to flight crew landing an aircraft with the landing gear in a retracted state. This could be intentional due to a mechanical issue or unintentional as the result of a distraction. | On approach, monitor whether the aircraft has timely and correctly lowered landing gear.<br>Predict likelihood of a wheels up landing based on landing gear status and distance between aircraft and airdrome.<br>Alerts<br>If likelihood of wheels up landing within next 20 seconds is high and persists for more than 5 seconds, generate alerts. |

TABLE 4-continued

| Example safe/unsafe operation criteria and assessment method. | |
|---|---|
| Safe/unsafe operation criteria | Safe operation assessment method |
| C7. Landing gear/Indication<br>When the landing gear or its component parts (including indications), has failed or exhibited damage. Landing gear occurrences include:<br>after landing, landing gear collapse due to mechanical malfunction<br>landing gear indication problems<br>use of emergency gear extension<br>tyre damage/deflation<br>overheated or smoking brakes<br>faults with floats and emergency flotation devices | After landing, monitor landing gear collapse, tyre damage/deflation, overheated or smoking brakes, faults with floats and emergency flotation devices.<br>Alerts<br>If likelihood of landing gear/indication occurrence immediately is high and persists for more than 5 seconds, generate alerts. |
| C8. Incorrect configuration<br>An aircraft system is incorrectly set for the current and/or intended phase of flight (take-off and landing phases).<br>An aircraft system should not incorrectly set for the current and/or intended phase of flight (take-off and landing phases).<br>Incorrect configuration includes occurrences where flight crew:<br>fail to extend the landing gear before landing (retract for amphibious operations)<br>inadvertently retract the landing gear after landing<br>incorrectly configure the flaps or slats<br>incorrectly applies carburettor heat (if applicable)<br>incorrectly applies reverse thrust (if applicable) | During take-off and landing phases, monitor landing gear, flaps or slats configuration, carburettor heat (if applicable), reverse thrust (if applicable).<br>Predict likelihood of incorrect configuration based on detected aircraft features.<br>Alerts<br>If likelihood of incorrect configuration within next 20 seconds is high and persists for more than 5 seconds, generate alerts. |
| C9. Ground proximity alerts/warnings<br>A Ground Proximity warning or alert.<br>An aircraft system should avoid a Ground Proximity warning or alert. | During take-off and landing phases, monitor aircraft altitude above ground.<br>Predict likelihood of ground proximity alerts/warnings based on comparison between aircraft altitude above ground and desired value.<br>Alerts<br>If likelihood of ground proximity alerts/ warnings within next 20 seconds is high and persists for more than 5 seconds, generate alerts. |
| C10. Flight below Lowest Safe Altitude (LSALT)<br>An aircraft is operated below the designated or planned Lowest Safe Altitude (LSALT) for the in-flight conditions and phase of flight.<br>Any occurrence that relates to an aircraft operating below the lowest safe altitude for the planned route, or area, in conditions other than day VMC. This includes:<br>crew error to descend below the LSALT in IMC<br>aircraft operating below LSALT without knowledge of terrain in the vicinity<br>ATC instruction to descend or operate below the are LSALT or Radar LSALT<br>aircraft that continue the approach below minimas with no visual reference to the runway. | Similar to A3, A5, C4, C5, C9 |
| C11. Lost/unsure of position<br>When flight crew are uncertain of the aircraft's position and/or request assistance from an external source.<br>Occurrences where an aircraft requests navigational assistance from ATC or other external means (such as pilots of other aircraft), in determining their current position. | |

TABLE 4-continued

Example safe/unsafe operation criteria and assessment method.

| Safe/unsafe operation criteria | Safe operation assessment method |
|---|---|
| C11. Collision with terrain (near and at airport)<br>Any collision between an airborne aircraft and the ground, water or an object, where the flight crew were aware of the terrain prior to the collision.<br>C12. Collision/Near collision (near and at runway)<br>An aircraft collides with another aircraft either airborne or on the runway strip, or a vehicle or person on the runway strip.<br>An aircraft comes into such close proximity with another aircraft either airborne or on the runway strip, or a vehicle or person on the runway strip, where immediate evasive action was required or should have been taken.<br>Collision with terrain includes:<br>impact with terrain (not including wires) from which the aircraft flies away<br>airborne collisions with fences<br>collision with objects on ground during take-off and landing or within the confines of a flight strip<br>Collisions include:<br>mid-air collisions<br>collisions on the runway between two aircraft, or<br>with a vehicle/person on a runway strip<br>Near collision, considerations should be given to:<br>one or both aircraft took significant avoiding action, or would have if time had permitted<br>one or both aircraft received an unexpected TCAS RA<br>aircraft tracks<br>awareness of one aircraft to the other | Monitor aircraft tracks, and its distance to other aircraft/terrain/ground vehicle/person/object.<br>Monitor awareness of one aircraft to the other aircraft/terrain/ground vehicle/person/object, avoiding plan and/or action.<br>Monitor damage to the fuselage, wings, or empennage.<br>Predict likelihood of collision by monitoring distance between aircraft and other aircraft/terrain/ground vehicle/person/object and present and predicted aircraft tracks.<br>Alerts<br>If likelihood of collision within next 20 seconds is high and persists for more than 2 seconds, generate alerts. |
| C14 Controlled flight into terrain (CFIT)<br>When a serviceable aircraft, under flight crew control, is inadvertently flown into terrain, obstacles or water without either sufficient or timely awareness by the flight crew to prevent the collision -occurs when pilot is in control of the aircraft and aware of the impending collision. The pilot's inadequate awareness of the terrain may result from a number of operational circumstances, including operating in IMC, at night, distractions, inadequate lookout, incorrect route flown, and in some cases may be the result of operating outside the tolerances of an instrument approach. | Similar to A3, A5, C4, C5, C9 |
| C15 Loss of separation<br>The failure to maintain a recognised separation standard (vertical, lateral or longitudinal) between aircraft that are being provided with an ANSP separation service includes a loss of:<br>procedural or surveillance/radar separation standards<br>prescribed runway or wake turbulence separation standards<br>runway proximity occurrences relating to a departing aircraft with another aircraft, vehicle or person occupying the same runway simultaneously (also to be coded as a 'Runway Incursion' and, where applicable, 'Near Collision')<br>visual separation by a pilot or air traffic controller in controlled airspace, if visual reference is lost | Monitor the distance/proximity/separation between aircraft with another aircraft/vehicle or person near and at airport.<br>Predict likelihood of loss of separation based on distance/proximity between aircraft with another aircraft/vehicle or person near and at airport.<br>Alerts<br>If likelihood of loss of separation within next 20 seconds is high and persists for more than 5 seconds, generate alerts. |
| C16 Aircraft separation - issues<br>Airspace - Aircraft separation occurrences not specifically covered elsewhere. Aircraft separation - Issues occurrences where separation is a concern but does not meet the definition of Loss of Separation or Near collision. | |

TABLE 4-continued

| Example safe/unsafe operation criteria and assessment method. | |
|---|---|
| Safe/unsafe operation criteria | Safe operation assessment method |
| C17. Loss of separation assurance (LOSA) Where separation has been maintained but has not been planned, actioned or monitored appropriately. LOSA is an occurrence where separation existed but: potential conflict was not identified; or separation was not planned or was inappropriately planned; or separation plan was not executed or was inappropriately executed; or separation was not monitored or was inappropriately monitored | Similar to A3, A5, C4, C5, C9, C15, C16 |
| C18 Airspace infringement Where there is an unauthorised entry of an aircraft into airspace for which a clearance is required. All occurrences, in which an aircraft enters controlled, restricted or a prohibited airspace without prior approval from the airspace 'owner' is to be recorded as an Airspace Infringement. This includes incidents where an aircraft takes off from a designated position inside a controlled or restricted area before receiving approval to do so. This equally applies to aircraft departing from a controlled environment. | Similar to A3, A5, C4, C5, C9, C15, C16 |
| C19 Operational non-compliance Non-compliance of an ANSP verbal or published instruction. These occurrence type relate specifically to flight crews not adhering to instructions issued by an ANSP, be it a verbal instruction or a clearance that relates to a published instruction. These instructions can relate to: aircraft heading route altitude busts flying the wrong SID or STAR or flying it incorrectly. | |
| C20 Airspace - other Airspace occurrences not specifically covered elsewhere. If an occurrence is coded as Airspace - Other, then a brief description of the actual event is recorded. | |
| D1. Animal strike AA collision between an aircraft and an animal. Animal strikes occurrences include situations in which the aircraft physically strikes any flightless animal. A near animal strike or a suspected animal strike (where the pilot reports that they "may have hit an animal" but no evidence is found) are also coded as animal strikes but as 'Events'. | Detect and monitor animals near and at airport. Monitor distance/proximity between aircraft and animal(s) near and at airport. Predict likelihood of an animal strike based on distance/proximity between aircraft and animal(s) near and at airport. Alerts If likelihood of animal strike within next 20 seconds is high and persists for more than 5 seconds, generate alerts. |
| D2. Bird strike A collision between an aircraft and a bird. Bird strike occurrences include situations in which the aircraft is in flight, or taking off or landing. Bird strike also include occurrences where a bird carcass is found on a runway. A rejected take-off or go-around may be used as a preventative means of avoiding a bird. | Similar to D1 |
| D3. Wildlife - Other Wildlife related occurrences not specifically covered elsewhere includes: flying through insect plagues insects in pitot tubes etc reports of animals/birds on the aerodrome snakes on planes | Similar to D1 |
| D4. Near encounter with remotely piloted aircraft | Similar to A5, A6 and B3 |
| D5 Turbulence/windshear/microburst Aircraft performance and/or characteristics are affected by turbulence, windshear or a microburst. | Similar to A3, A5, C4, C5, C9, C15, C16, C18 |

TABLE 4-continued

| Example safe/unsafe operation criteria and assessment method. | |
|---|---|
| Safe/unsafe operation criteria | Safe operation assessment method |
| When coding Turbulence/Windshear/ Microburst, the effect on aircraft performance or control must be clearly quantifiable, based on information such as:<br>significant airspeed fluctuation<br>significant altitude, or profile deviations<br>significant changes in rate of climb or descent<br>severity of encounter<br>the degree of influence on aircraft control<br>the degree to which the integrity of the airframe is affected<br>if injury to occupants has occurred. | |
| D6 Unforecast weather<br>Operations affected by weather conditions that were not forecast or not considered by the flight crew.<br>Any aircraft operation that is affected by an unforecast weather phenomenon. Also includes weather conditions not considered prior to flight or during the flight by flight crew. Includes diversions, holding, missed approaches, or flight continues through adverse weather or visibility conditions. | |
| D7 Emergency evacuation<br>When crew and/or passengers vacate an aircraft in situations other than normal and usually under the direction of the operational crew.<br>An 'Emergency Evacuation' is coded when there is a level of urgency to have all crew and passengers disembark as the result of an occurrence that places them at risk to serious injury or death. This can be achieved by any number of means, including:<br>emergency slides,<br>integrated aircraft stairs,<br>aerobridge, or<br>external stairs. | |
| D8. Fire<br>Any fire that has been detected and confirmed in relation to an aircraft operation.<br>D9. Fumes<br>When abnormal fumes or smells are reported on board the aircraft includes reports of abnormal smells not associated with normal aircraft operations.<br>D10. Smoke<br>When smoke is reported to be emanating from:<br>a) inside the aircraft; or<br>b) an external component of the aircraft; or<br>c) a smoke alarm activates.<br>Smoke occurrences relate specifically to 'non-normal' situations whereby crew, ground staff or passengers detect smoke that is not associated with the normal operation of the aircraft.<br>D11. Icing<br>Accumulation of ice on aircraft that adversely affects aircraft controllability<br>D12. Lightning Strike<br>The aircraft, or another object, is struck by lightning | Detect and monitor fire, fume, smoke, icing and lightning near and at airport, including aircraft.<br>Monitor distance between aircraft and detected fire, fume, smoke.<br>Predict effects of fire, fume, smoke, icing, or lightning near and at airport.<br>Alerts<br>If fire, fume, smoke, icing or lightning is adversely affecting operating aircraft near and at airport, generate alerts.<br>If fire, fume, smoke, icing or lightning is detected, inform relevant stakeholder, airport fire service, to inspect/extinguish. |
| E1 Radar/surveillance<br>Any faults or deficiencies in the operation of a radar or surveillance system used for the purpose of separating aircraft in the air or on the ground. This occurrence type relates specifically to failed radar or surveillance services, including ADS-B ground stations, where no redundancy exists, and ANSP services revert to a 'procedural' environment. Where available, the record should indicate the length of time the facility was out of service. | Similar to A3, A5, C4, C5, C9, C15, C16, C18 |

TABLE 4-continued

Example safe/unsafe operation criteria and assessment method.

| Safe/unsafe operation criteria | Safe operation assessment method |
|---|---|
| Where redundancy is available and there has been little or no effect on operations then the occurrence is to be classified as an 'Event' | |
| E1. Runway lighting<br>Any faults or deficiencies associated with the operation of runway lighting. This occurrence type covers all types of runway lighting issues necessary for the safe operation of aircraft during the take-off and landing phases of flight. This includes:<br>approach and slope guidance lighting (PAPI & HIRL)<br>runway edge and centre lighting<br>Pilot Activated Lighting (PAL) where the fault is linked to runway ground equipment | Detect and monitor runway lighting.<br>Predict effects of runway lighting faults/deficiencies on operating aircraft near and at airport.<br>Alerts<br>If runway lighting faults/deficiencies is adversely affecting operating aircraft near and at airport, generate alerts.<br>If runway lighting faults/deficiencies is detected, inform relevant stakeholder, airport engineering team, to inspect/repair. |
| E2. Infrastructure - other<br>Infrastructure related occurrences not specifically covered elsewhere.<br>If an occurrence is coded as Infrastructure - Other, then a brief description of the actual event is recorded in the accompanying text box. | Similar to B1, B2, B3, B5, B6, B16 |

Table 3 sets out an example of the occurrence types and groups that occur in an aviation environment particularly near and at airport (left column), such as runway (A1 to A7), ground operations (B1 to B14), aircraft control (C1 to C20), environment (D1 to D12), infrastructure (E1 to E3) occurrence groups. Multiple occurrence types can be monitored within each occurrence group category. In one example, the occurrence type runway excursion A1 is one of the occurrence types that are classified under runway occurrence group. These occurrence types are level 3 occurrence types, which are defined and used by Australian Transport Safety Bureau (ATSB). Advantageously, the system may be configured to monitor up to 59 ATSB level 3 occurrence types, i.e. A1 to E3 as exemplified in Table 3, in comparison with the five occurrence types which are typically monitored using current aviation safety monitoring systems.

In the right column of Table 3, there are shown detection and tracking multiple objects data processing capability and brief safe operation criteria that are required for each occurrence group, including object types, classes, different physical (both current and predicted) properties of each monitored object, and the types of risks and accompanying safe operation criteria that is associated with each occurrence type. Table 4 provides additional details into the particular safe and unsafe operation criteria (left column) for each of the occurrence types and in the right hand column there is provided the examples of assessment criteria/method for each of the safety operation criteria.

For example, in the example of the occurrence type A1 runway excursion illustrated in FIGS. 3 to 6, the system 2 and method 200 is first configured to receive sensor information from the at least two sensors 26, 28, 30, i.e. the LiDAR 26 and camera sensors 28, from at least one monitoring unit 22, located in at least one location in the aviation environment in step 202. The system 2, the processing system 4 in particular, is configured to fuse the two types of sensors' information with temporal and spatial information Further in step 204 the system 2 is configured to process the sensor information including using the fused information to identify/classify/detect at least one object, such as the aircraft 16 and runway 40. Further the system 4 can calculate the at least one objects' physical properties, and to predict the at least one objects' physical properties. For example, the aircraft's position, travel direction, velocity, acceleration, altitude and attitude is monitored as well as the distance between aircraft 16 of interest and object of interest, e.g. the runway 40 in particular its' surface, boundary 49, markings 50, centreline 52, runway threshold 48 and to calculate runway distance remaining, distance between aircraft and runway boundaries, centreline and the like.

Additional information 54 can be received by the processing system 4 to assist and/or facilitate calculation of the objects' physical properties and estimation/prediction of their physical properties and/or safe operation criteria, including runway data, such as length, boundaries, entries and exits, surface characteristics such as material or friction coefficients, and/or surface conditions such as wet, ice/snow, metrological data such as wind, temperature and the like, and aircraft data, such air craft type and capabilities/characteristics, weight, flying phase and/or intended or reference position or motion.

Further in a next step 206 of the method 200, the system 2 is configured to measure or calculate an estimate or prediction of the particular physical properties of the aircraft 16 and runway 40 which may relate to a particular predetermined safety criteria, i.e. A1. For aircraft landings, as illustrated in FIG. 4, the system 2 is configured to monitor the aircraft approach flight path from when the aircraft 16 is 50 metres above the ground 31, to measure and/or calculate an estimate or prediction of the touch-down point 32, including by measuring and calculating predicted location, travel direction, velocity, deceleration and altitude as exemplary physical properties. After the aircraft 16 has touched down on the runway 40, the system 2 is configured to track aircraft position 33 along a tracked path 37, to determine the predicted path 38, based on the measured and predicted aircraft position and speed, and to calculate and predict where the aircraft's speed will become low enough to ensure a safe stop to a safe stopping position 34 before the end of the runway 40 and expected run-way exit point 35.

Figure 5:
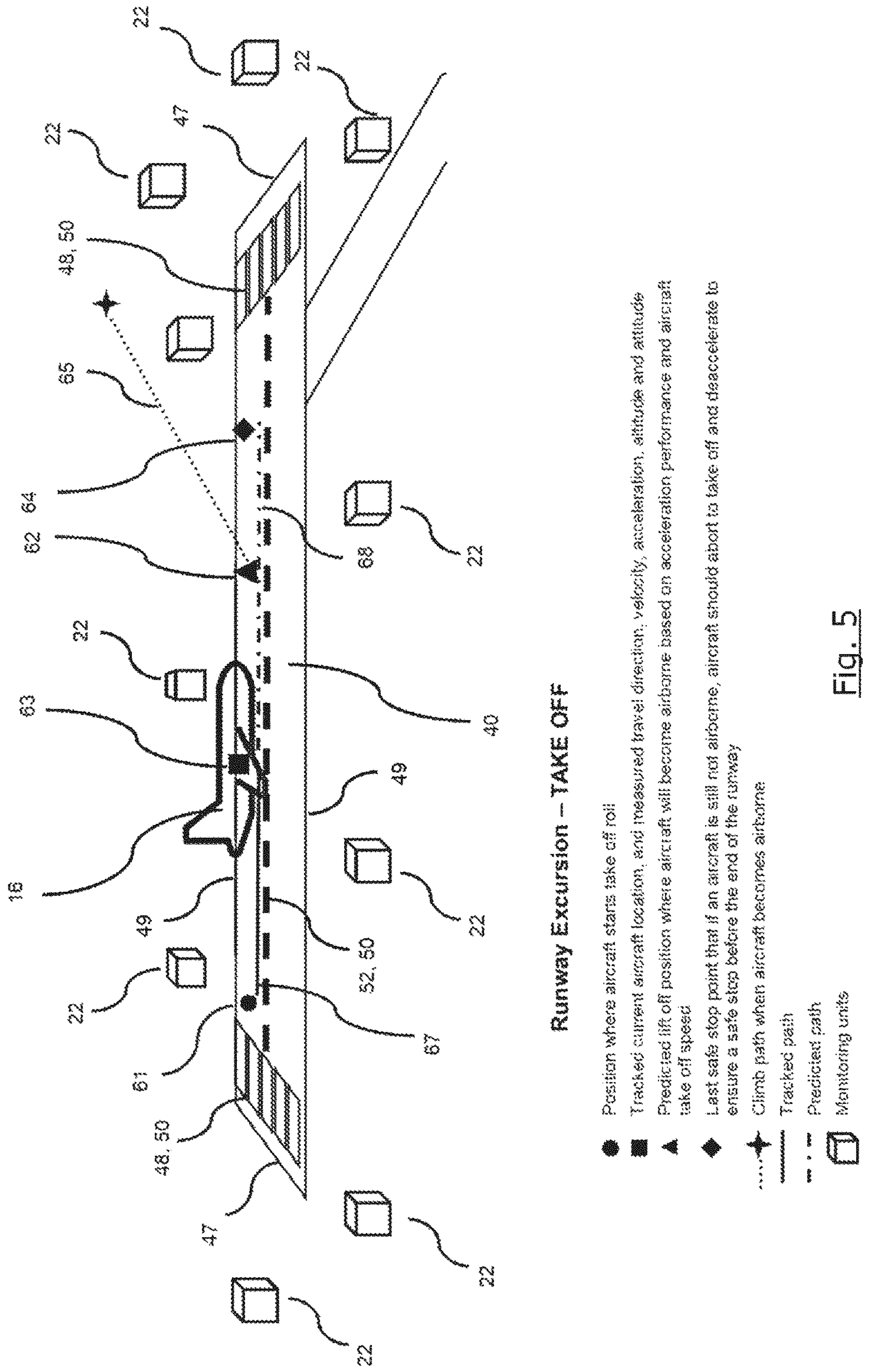

As illustrated in FIG. 5, for aircraft take-off, the system 2 is configured to monitor and/or track current aircraft location 63 of the aircraft 16, and/or measure and/or calculate an estimate or prediction of the lift-off position 62, last safe stopping point 64, after it has started from its take-off roll position 61, and before it commences its airborne flight path 65.

Figure 6:
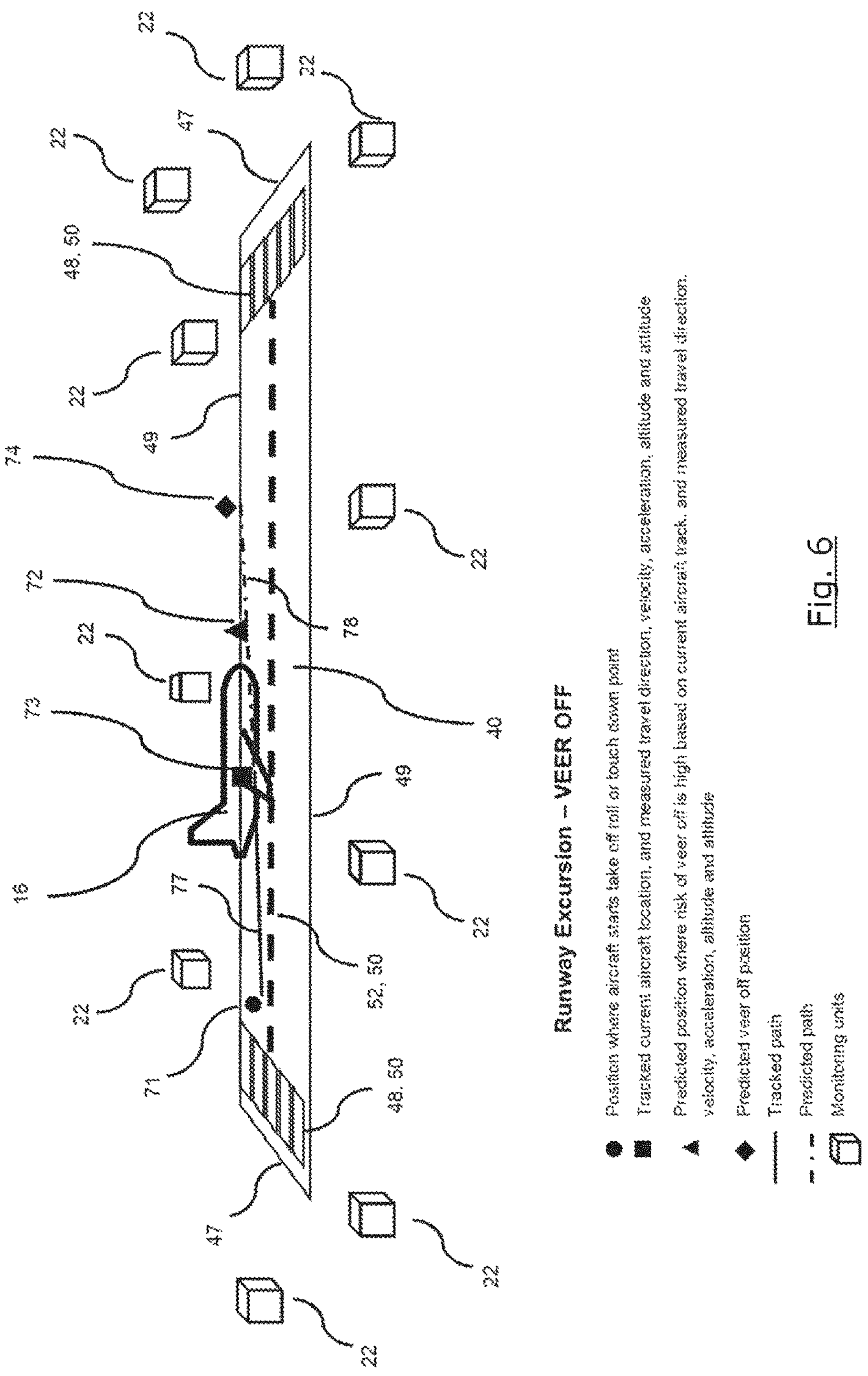

In the example shown in FIG. 6, to monitor for the risk of runway veer-off, the system 2 is configured to monitor and/or track current aircraft location 73 of the aircraft 16, and/or measure and/or calculate an estimate or prediction of the position of the aircraft on the runway (predicted path) 78, aircraft position deviation from runway centreline 52, distance between aircraft and runway boundary 49, and predicted position where risk of veer-off is high 72, and predicted veer-off position 74.

The system 2 is also configured to store the particular safe operation criteria in step 208 such as the calculated safe lift-off position for a particular aircraft type, for example, under specific aircraft loading, runway and meteorological conditions during take-off, calculated safe stopping position i.e. where the aircraft speed becomes low enough to ensure a safe stop before the end of the runway and/or aircraft can safely exit from the runway for a particular aircraft type under specific aircraft loading, runway and meteorological conditions during landing. The system 2 can also be configured to calculate the acceptable limits for the lift-off, veer off, touch-down and safe stopping positions, i.e. acceptable runway distance remaining, and/or to calculate and predict the safe operation criteria as required.

The system 2, is then configured to compare the measured or predicted physical properties of the aircraft 16 and runway 40 to the safe operation criteria to determine the potential runway excursion risks. In particular the system 2 in step 212 can predict the likelihood of runway excursion by monitoring distance between aircraft landing gears/fuselage/wingtip and runway side boundary for veer off and by monitoring runway distance remaining for runway overrun. If the comparison shows that the measured and predicted physical properties of the aircraft and runway are acting within safe operating criteria, then the system 2 can determine that the likelihood of risk of runway excursion is low and an indication/alert may be generated to a user to confirm safe aviation operation.

Alternatively, the system 2 is configured to determine that the comparison shows that risk of runway excursion is medium or high, i.e. runway excursion may occur in the next 15 seconds, or in the next 5 seconds, and the system is further configured to transmit at least one alert to at least one user accordingly. The user(s) could include aviation traffic control (ATC), pilots, emergency response team, and the like. Finally, if an excursion has occurred, the system 2 is configured to send an alert for at least one user, particularly emergency response teams and relevant authorities.

Figure 3:
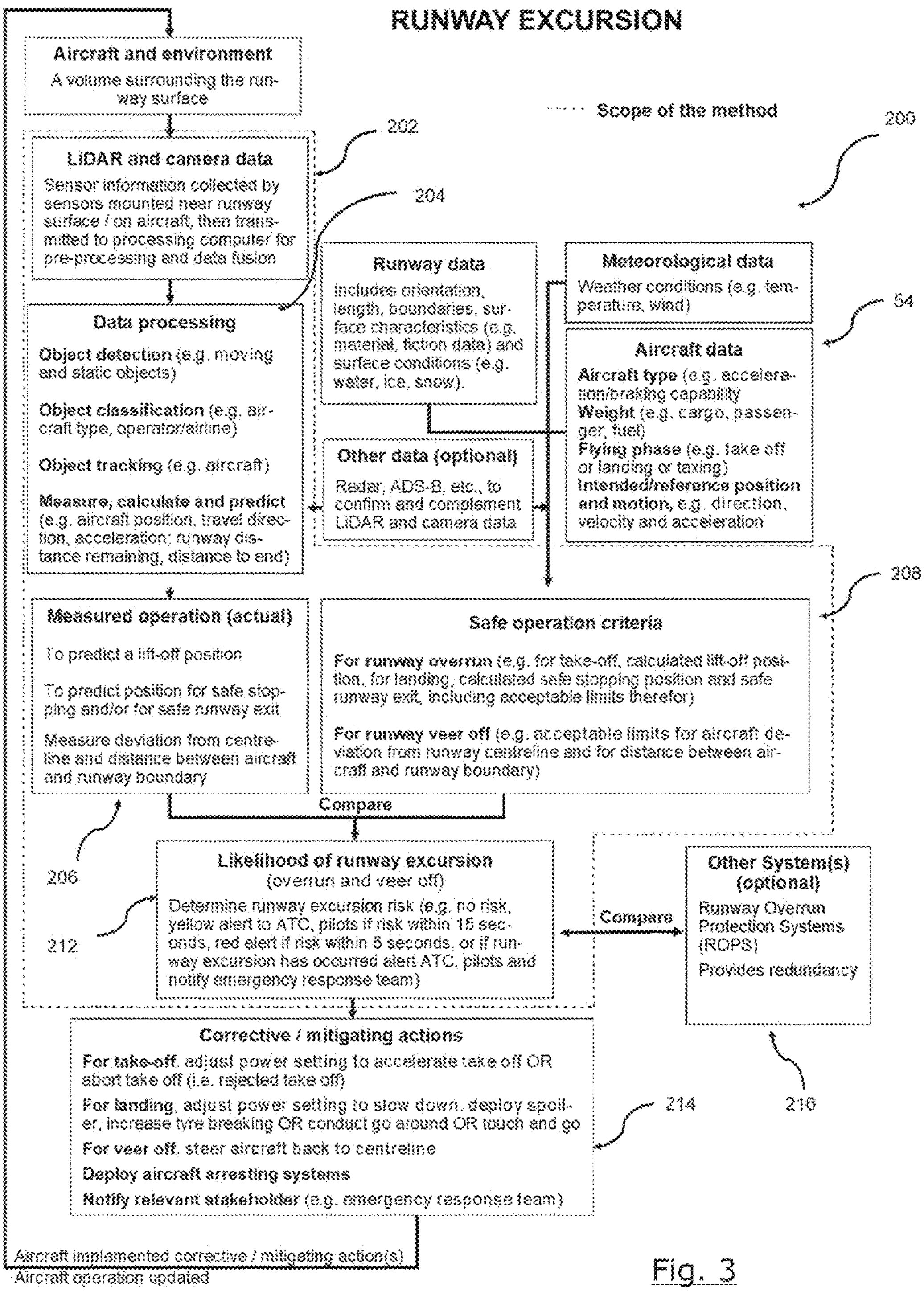
FIG. 3 is an example flow-chart for the system and method of FIG. 1 for a particular occurrence type, runway excursion.

Lastly, as illustrated in FIG. 3, the system 2 in step 214 is configured to suggest corrective or mitigation actions if necessary, i.e. if it has been determined that the risk of runway excursion is not low but is medium or high to at least one appropriate user. For example, for take-off, the system 2 is configured to send an alert to at least one pilot of the aircraft to adjust power settings to accelerate the take-off or to abort the take-off. Accordingly, for landing, the system 2 can send an alert to at least one pilot to adjust power settings to slow down (e.g. reverse thrust), deploy spoiler and/or increase tyre braking, or conduct go around or touch and go. Similarly, for a runway veer-off, the alert could be sent to at least one pilot to steer the aircraft back to centreline from an off-centreline location. Alternatively, the system 2 can recommend deployment of an engineered materials arresting system or an aircraft arresting system, i.e. a net-type aircraft barrier or an alternative system or apparatus having an equivalent function, to prevent runway overrun.

The system 2 in step 216 is also able to receive information from existing safety nets to facilitate processing of information and calculation of measured operational physical properties and prediction thereof and to act as a redundancy. For example, the system can be configured to receive information from runway overrun protection systems (ROPSI).

Figure 7:
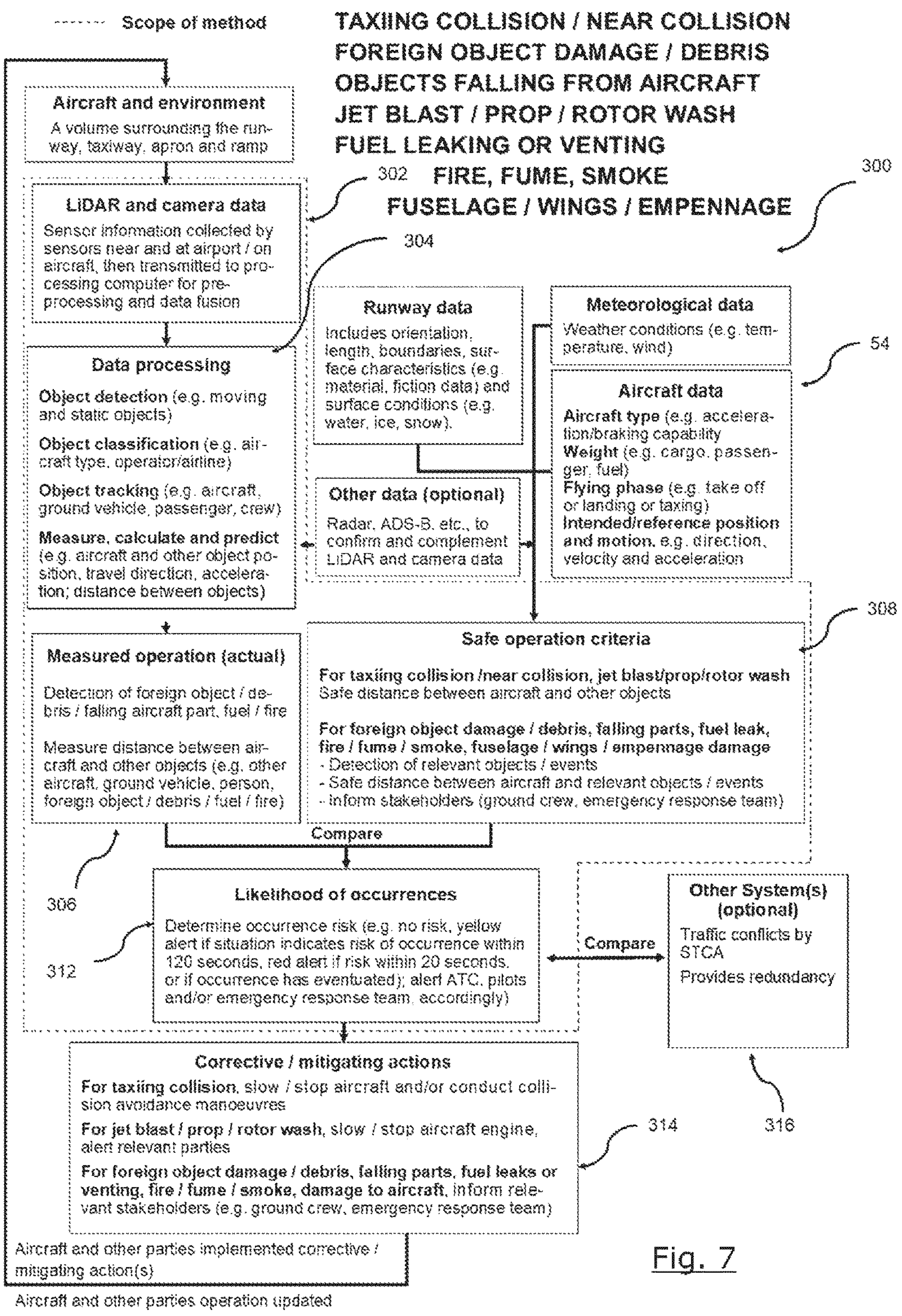
FIG. 7 is an example flow-chart for the system and method of FIG. 1 for a particular set of occurrence types.
Figure 8:
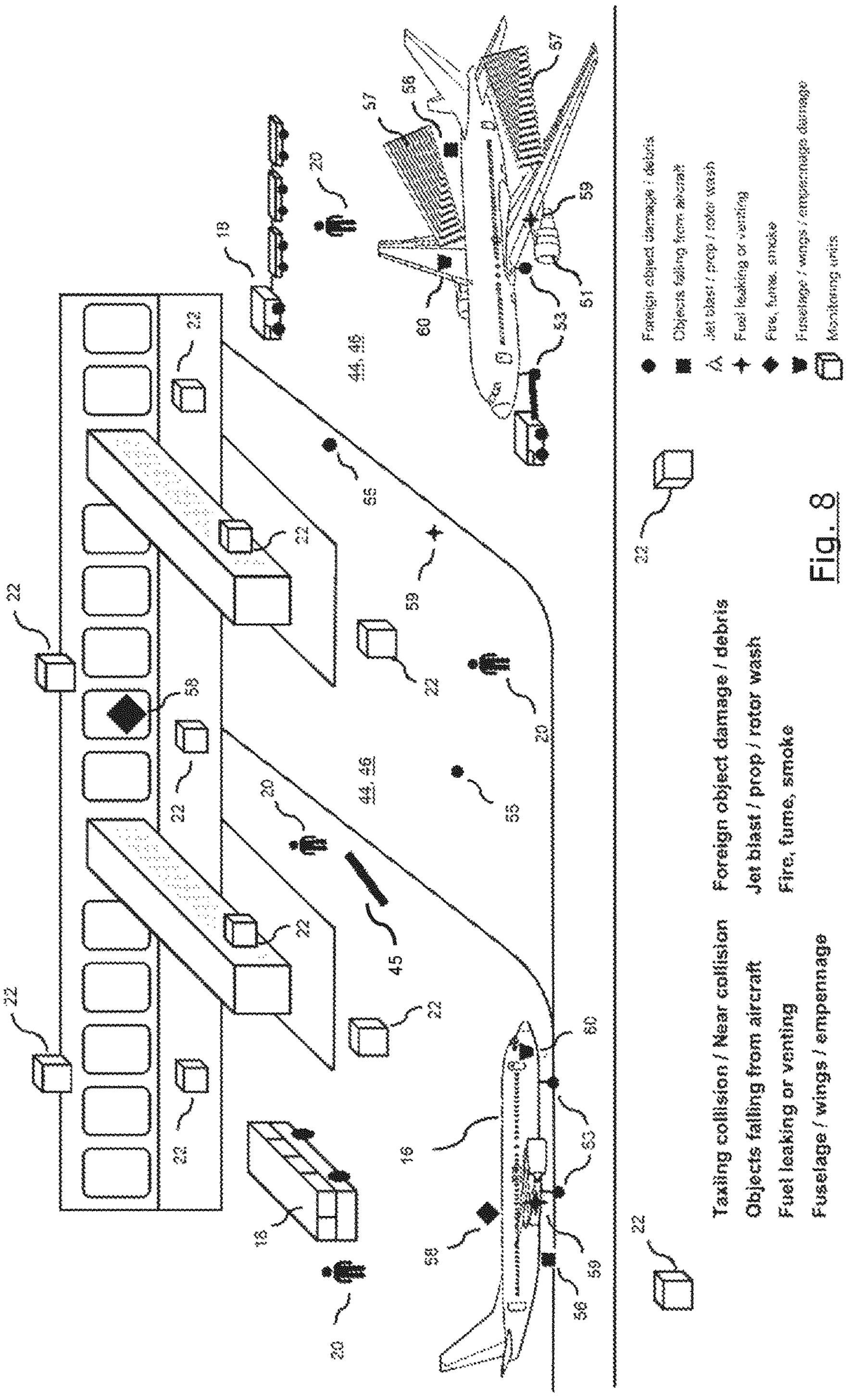
FIG. 8 is a schematic diagram illustrating a particular set of occurrence types as illustrated in flow-chart of FIG. 7.

In a further example of the system 2 and method 300 as discussed according to preferred embodiments of the present invention, as illustrated in FIGS. 7 and 8, the risks associated with ground operations (B1 to B16) in the aviation environment near and at the airport can be more particularly monitored including taxiing collision/near collision, foreign object damage/debris 55, objects falling from aircraft 56, jet blast/propeller/rotor wash 57, fire/fume/smoke 58, fuel leaks 59, damage to aircraft fuselage/wings/empennage 60 and the like however in this example taxiing collision/near collision B3 is discussed in more detail.

For example, in the more specific example of the occurrence type B3 taxiing collision/near collision illustrated in FIGS. 7 and 8, the system 2 is first configured in step 302 to produce, transmit and/or receive sensor information from the at least two sensors, i.e. the LiDAR and camera sensors 26, 28, in the form of multiple monitoring units 22 from multiple locations in the aviation environment. The system 2, the processing system 4 in particular, is configured to fuse the two sensors' information from each monitoring unit 22 by apply a time-syncing process and/or a sensor calibration process.

Further the system 2 in step 304 is configured to use the fused information to detect and identify at least one object, such as the aircraft(s) 16, ground vehicles and crew 18, 20, and airport infrastructure such as the boarding gates and the like, to calculate the at least one objects' physical properties, and to predict the at least one objects' physical properties. For example, the aircrafts' position, travel direction, velocity, acceleration, altitude and attitude is monitored as well as the distance between aircraft of interest and object of interest, e.g. the ground vehicles and crew, boarding gates, gate boundaries and the like.

Additional information 54 can be received by the processing system 4 to assist and/or facilitate calculation of the objects' physical properties and estimation/prediction of their physical properties and/or safety operation criteria, including runway data, such as boarding gates and bridges, apron and ramp area boundaries, surface characteristics such as material or friction coefficients, and/or surface conditions such as wet, ice/snow, metrological data such as wind, temperature and the like, and aircraft data, such air craft type and capabilities/characteristics, weight, flying phase and/or intended or reference position or motion, and ground crew/vehicle data.

Further in a next step 306 of the method 300, the system 2 is configured to measure or calculate an estimate or prediction of the physical properties of the aircraft(s) 16, airport infrastructure and ground vehicles/crew 18, 20. For an aircraft taxiing to and from the boarding gates and bridges, as illustrated in FIG. 8, the system 2 is configured to monitor, measure and/or calculate an estimate or prediction of the path(s) of aircraft(s) 16 taxiing to and from the boarding gates, and the movement of nearby ground crew and vehicles. The monitored, measured and/or calculate physical properties include position, speed, travel direction, track and acceleration.

As illustrated in FIG. 8, the system 2 is configured to measure and/or calculate an estimate or prediction of the distance between the aircraft(s) and any ground crew/vehicles and airport infrastructure to monitor any risk of collisions or near-collisions therebetween.

The system 2 in step 308 is also configured to store the particular safe operation criteria such as the defined and/or calculated safe distances between the objects, i.e. aircraft 16, ground vehicles/crew infrastructure 18, 20. The system 2 can also be configured to calculate the acceptable limits for the same and/or to calculate and predict the safe operation criteria as required.

The system 2, in the next step 312, is then configured to compare the measured or predicted physical properties of the aircraft 16 and other objects to the safe operation criteria to determine the potential collision risks. In particular the system 2 can predict the likelihood of collisions or near collisions by monitoring distance between any two or more objects, i.e. the distance between the aircraft(s) 16 and any ground crew/vehicles 18, 20 and airport infrastructure 42, 44. If the comparison shows that the measured and predicted physical properties of the aircraft 16, ground crew/vehicles 18, 20 and airport infrastructure are acting within safe operating criteria, then the system 2 in step 312 can determine that the likelihood of risk of runway excursion is low and an indication/alert may be generated to at least one user to confirm safe aviation operation.

Alternatively, the system 2 is configured to determine that the comparison shows that risk of collision or near collision is medium or high, i.e. runway excursion may occur in the next 120 seconds, or in the next 20 seconds, and the system is further configured to transmit at least one alert to at least one user accordingly i.e. yellow alert or red alert. The user(s) could include aviation traffic control (ATC), pilots, emergency response team, and the like. Finally, if a collision has occurred, the system is configured to send an alert for at least one user, particularly emergency response teams and relevant authorities.

Lastly, as illustrated in FIG. 7, the system 2 in step 314 is configured to suggest corrective or mitigation actions if necessary, i.e. if it has been determined that the risk of runway collision or near collision is not low but is medium or high to an appropriate user. For example, the system 2 is configured to send an alert to a pilot, ground personnel 20 to slow/stop and/or conduct collision avoidance measures.

The system 2 in step 316 is also able to receive information from existing safety nets i.e. traffic conflicts by STCA to facilitate processing of information and calculation of measured operational physical properties and prediction thereof and to act as a redundancy.

Figure 9:
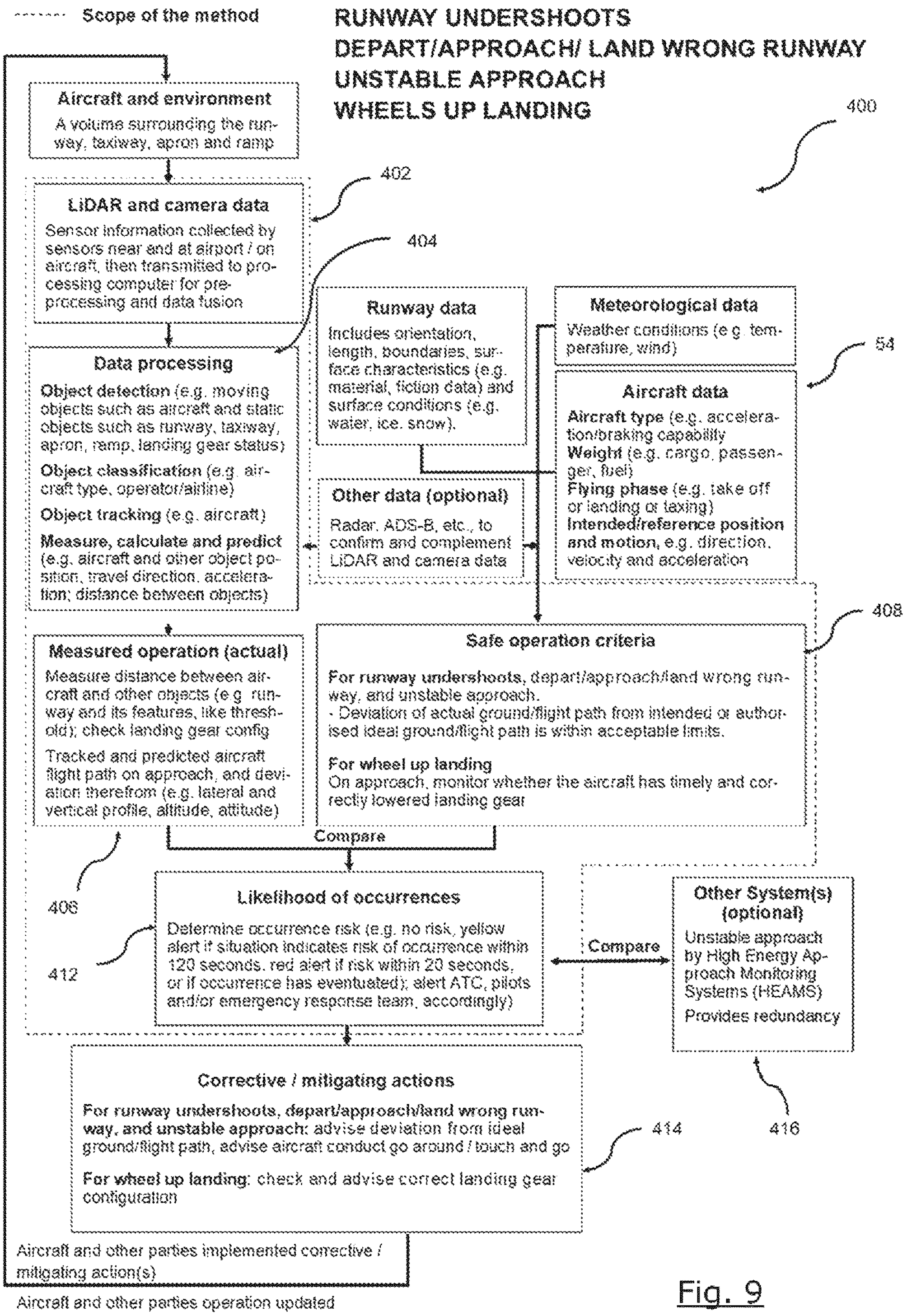
FIG. 9 is an example flow-chart for the system and method of FIG. 1 for a particular set of occurrence types.
Figure 10:
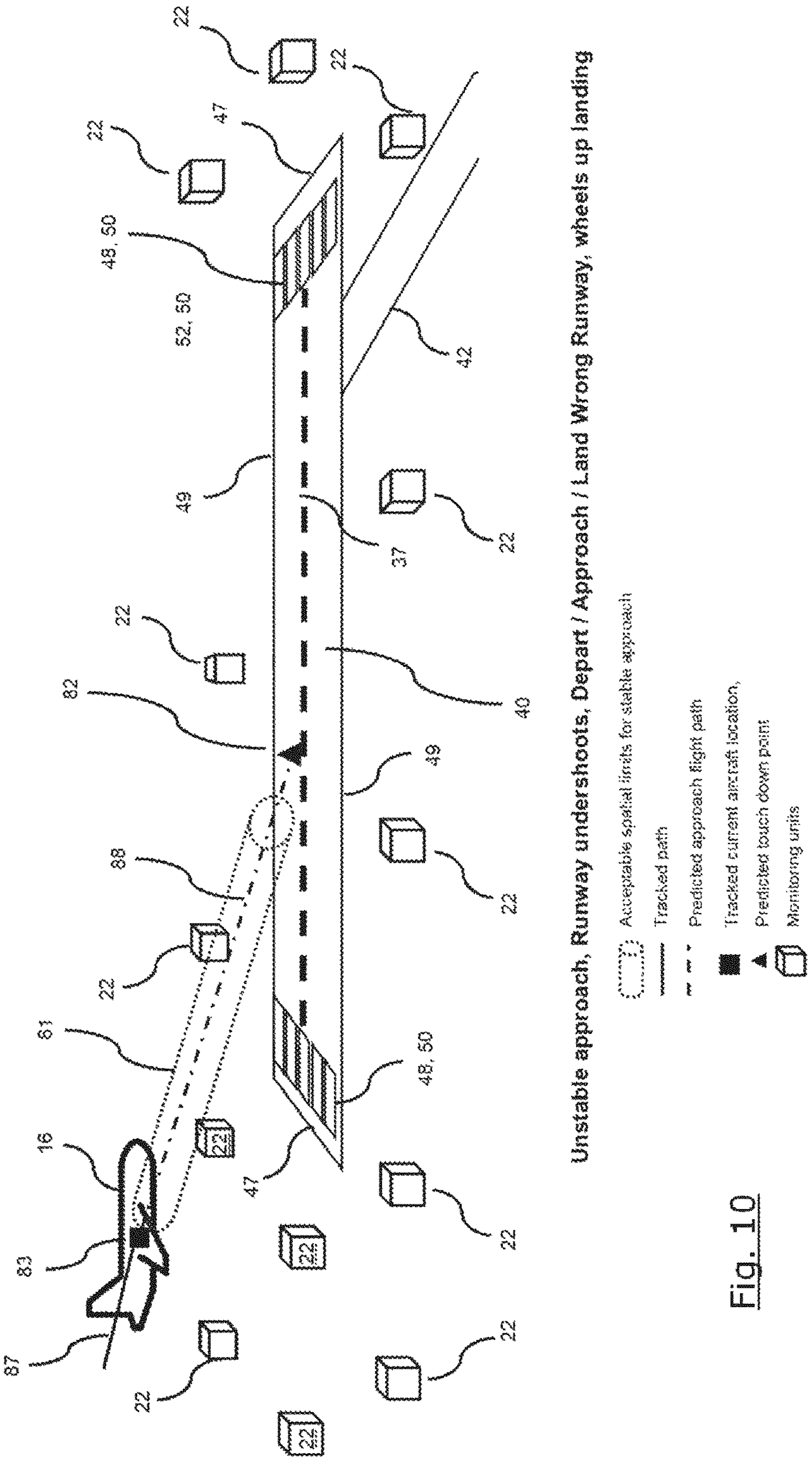
FIG. 10 is a schematic diagram illustrating a particular set of occurrence types as illustrated in flow-chart of FIG. 9.

In another further example of the system 2 and method 400 according to preferred embodiments of the present invention, FIGS. 9 and 10 illustrate the aircraft and runway control (A3, A5, C5, C6). More particularly using this method 400 the system 2 can be used to monitor risks associated with the aviation activities in the aviation environment near and at the runway 40 including runway undershoots, depart/approach/land wrong runway, unstable approach and wheels up landing however in this example wheels up landing and unstable approach is discussed in more detail below. FIG. 10 illustrates the application of the system 2 which tracks the path 87 of the aircraft 16, monitors the current location 83 of the aircraft, and predicts the acceptable spatial limits for stable approach 81 as well as a predicted approach flight path 88 and touch down point 82.

The system 2 is first configured in step 402 to receive sensor information from the at least two sensors, i.e. the LiDAR and camera sensors 26, 28, in the form of multiple monitoring units 22, in the aviation environment. The system 2, the processing system 4 in particular, is configured to fuse the two sensors' information from each monitoring unit 22 by a time-syncing process and/or sensor calibration process.

Further the system 2 in step 404 is configured to use the fused information to detect and/or identify at least one object, such as the aircraft 16, to detect and classify at least one object feature, such as the aircraft landing gear status, i.e. landing gear 53, in an extended or a retracted position, to calculate the at least one objects' physical properties, and to predict the at least one objects' physical properties. For example, the aircraft's position, travel direction, velocity, acceleration, altitude and attitude are monitored.

Additional information 54 can be received by the processing system 4 to assist and/or facilitate calculation of the objects' physical properties and estimation/prediction of their physical properties and/or safety operation criteria, including runway data, such as length, boundaries, entries and exits, surface characteristics such as material or friction coefficients, and/or surface conditions such as wet, ice/snow, metrological data such as wind, temperature and the like, and aircraft data, such air craft type and capabilities/characteristics, weight, flying phase and/or intended or reference position or motion.

Further in a next step 406 of the method 400, the system 2 is configured to measure or calculate an estimate or prediction of the physical properties of the aircraft 16 and runway 40, in the system 2 is configured to measure and/or calculate an estimate or prediction of the approach flight path, tracked current aircraft location, deviation of path profile parameters such as lateral and vertical profile, airspeed, bank angle, altitude, vertical speed, altitude and attitude.

For wheels up landing, as illustrated in FIGS. 9 and 10, the system is configured to particularly detect/classify/measure the configuration of the landing gear 53, such as whether the landing gear is extended/deployed partially or fully, extended/deployed in a timely way or is still in a retracted position.

The system 2 in step 408 is also configured to store the particular safe operation criteria such as for wheels up landing, whether on approach, the spatial position along the approach flight path of the aircraft 16 at which the landing gear should be fully extended/deployed to achieve safe touchdown/landing. For unstable approach, acceptable deviation of measured flight path from the intended/authorised/ideal flight path. The system 2 can also be configured to calculate the acceptable limits thereof and/or to calculate and predict the safe operation criteria as required.

The system 2 in the next step 412, is then configured to compare the measured or predicted physical properties of the aircraft and runway to the safe operation criteria to determine the potential risks. In particular the system can predict the likelihood of incorrect aircraft landing configuration by monitoring the landing gear configuration. The system can also predict the likelihood of unstable approach by monitoring the approach flight path. If the comparison shows that the measured and predicted physical properties of the aircraft and landing gear configuration are acting within/complying safe operating criteria, then the system can determine that the likelihood of risk of wheels up landing and/or unstable approach is low and an indication/alert may be generated to at least one user to confirm safe aviation operation.

Alternatively, the system 2 is configured to determine that the comparison shows that risk of wheels up landing and/or unstable approach is medium or high, i.e. wheels up landing and/or unstable approach may occur in the next 120 seconds, or in the next 20 seconds, and the system is further configured to transmit at least one alert to at least one user accordingly i.e. yellow alert or red alert. The user(s) could include aviation traffic control (ATC), pilots, emergency response team, and the like. Finally, if a wheels up landing has occurred, the system is configured to send an alert for at least one user, particularly emergency response teams and relevant authorities.

Lastly, as illustrated in FIG. 9 in step 414, the system 2 is configured to suggest corrective or mitigation actions if necessary, i.e. if it has been determined that the risk of wheels up landing and/or unstable approach is not low but is medium or high to an appropriate user. For example, for wheels up landing, the system is configured to send an alert to at least one user, e.g. pilot, to check and/or advise landing gear configuration. For unstable approach, the system is configured to send an alert to at least one user, e.g. pilot, to check and/or advise the measured deviation from ideal flight path, and the aircraft to conduct a go around or touch and go.

The system 2 in step 416 is also able to receive information from existing safety nets to facilitate processing of information and calculation of measured operational physical properties and prediction thereof and to act as a redundancy. For example, the system 2 can be configured to receive information from High Energy Approach Monitoring Systems (ROPSI).

The system can provide real-time monitoring of aviation activities, detection of unsafe aviation activity and generation of alerts, which can be displayed on at least one standalone screen or can be integrated with existing systems located in at least a cockpit of said aircraft, air traffic control towers/centres, ground control locations and airport emergency response team locations. The display format may include 3-D map and panoramic view.

The system and methods described above provide one or more of the following advantages including improvement in aviation safety, operation efficiency, capacity, operating cost efficiency, environment and security. Specifically, the advantages include the following: enhanced situation awareness of unsafe aviation activities to human operators and operating systems, e.g. Air Traffic Control officers, pilots, aircraft on board systems that control the aircraft and emergency response team: awareness of all objects and activities within the aviation operating environment near and at airport; prompt detection and awareness (within seconds) of deviation from and/or violation of safe aviation operation criteria; human operators and/or operating systems can immediately assess the detected and identified unsafe aviation activities, and implement appropriate corrective actions; prevention of aviation safety occurrences or reduction of severity/cost of aviation safety occurrences; increased redundancy to the existing technologies and procedures that detect/identify/prevent/mitigate unsafe aviation activities; a more cost-effective solution/technique/system compared to existing systems/technologies/solutions; reduced reliance on human involvement, e.g. human observation at Air Traffic Control; minimum changes to current procedures or workload.

INDUSTRIAL APPLICABILITY

It is apparent from the above, that the arrangements described are applicable to aviation industries, and related industries, and the processes, systems and equipment therefor.

GENERAL STATEMENTS

Embodiments:

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. It is also understood that each unit between two particular units are also disclosed. For example, if 10 and 15 are disclosed, then 11, 12, 13, and 14 are also disclosed.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

The terms in the claims have the broadest scope of meaning they would have been given by a person of ordinary skill in the art as of the relevant date.

The term "associate", and its derivatives (e.g. "associating") in relation the combination of data includes the correlation, combination or similar linking of data.

The term "data fusion", "fusing" and like terms are intended to refer to a multi-level process dealing with the association, correlation, combination of data and information from single and multiple sources to achieve refined position, identify estimates and complete and timely assessments of situations, risks and their significance.

The terms "a" and "an" mean "one or more", unless expressly specified otherwise

Neither the title nor any abstract of the present application should be taken as limiting in any way the scope of the claimed invention.

Where the preamble of a claim recites a purpose, benefit or possible use of the claimed invention, it does not limit the claimed invention to having only that purpose, benefit or possible use.

In the present specification, terms such as "part", "component", "means", "section", or "segment" may refer to singular or plural items and are terms intended to refer to a set of properties, functions or characteristics performed by one or more items having one or more parts. It is envisaged that where a "part", "component", "means", "section", "segment", or similar term is described as consisting of a single item, then a functionally equivalent object consisting of multiple items is considered to fall within the scope of the term; and similarly, where a "part", "component", "means", "section", "segment", or similar term is described as consisting of multiple items, a functionally equivalent object consisting of a single item is considered to fall within the scope of the term. The intended interpretation of such terms described in this paragraph should apply unless the contrary is expressly stated or the context requires otherwise.

The term "connected" or a similar term, should not be interpreted as being limitative to direct connections only. Thus, the scope of the expression an item A connected to an item B should not be limited to items or systems wherein an output of item A is directly connected to an input of item B. It means that there exists a path between an output of A and an input of B which may be a path including other items or means. "Connected", or a similar term, may mean that two or more elements are either in direct physical or electrical contact, or that two or more elements are not in direct contact with each other yet still co-operate or interact with each other.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention.

Functionality may be added or deleted from the block diagrams/flow charts, and operations may be interchanged among functional blocks. Steps may be added or deleted to methods describe within the scope of the present invention.

Although the invention has been described with reference to specific examples, it will be appreciated by those skilled in the art that the invention may be embodied in many other forms.

The claims defining the invention are as follows:

1. A system for monitoring activities in an aviation environment, the system including:

at least two monitoring units physically deployed at a plurality of dedicated locations throughout the aviation environment, each monitoring unit including at least two types of sensors comprising a range sensor and a camera sensor co-located within the monitoring unit, wherein:

the sensors are adapted to obtain, in real time, sensor information of at least two objects, including at least one runway and at least one aircraft, the monitoring units are mounted at a plurality of locations in the aviation environment, including at least one location at or near the runway, and at least one further location spatially separated from a first location, on or near one or more of a runway, taxiway, apron, ground vehicle, or airport infrastructure;

a processing system in real-time communication with the monitoring units being configured to receive said information from the sensors and being further configured to process said information to monitor and make predictions in relation to the at least two objects, wherein:

the processing system is configured to combine the range sensor information with the camera sensor information by applying data fusion to associate the sensor information with temporal information and spatial information; and applying data fusion includes processing the range sensor information and the camera sensor information acquired from the sensors at the plurality of locations in the aviation environment, including:

applying a time-syncing process to the range and camera sensor information acquired at the plurality of locations;

stitching or otherwise combining the range sensor information acquired at the plurality of locations to form a spatially registered composite range data representation;

stitching or otherwise combining the camera sensor information acquired at the plurality of locations; and projecting or otherwise fusing the acquired range sensor information onto the acquired camera sensor information, or projecting or otherwise fusing the acquired camera sensor information onto the acquired range sensor information, to generate a spatially and temporally unified representation of the aviation environment including the at least two objects and one or more aviation-environment features;

the system being further configured to determine spatial and temporal relationships or interactions between (i) the at least two objects, and (ii) at least one object of the at least two objects and at least one aviation-environment feature, and to compare the temporally and spatially associated sensor information of the at least two objects with predetermined safety operation criteria, and to generate an alert signal when the compared information indicates a risk or likelihood of at least three different occurrence types from the following list of occurrence types:

runway excursion;
runway incursion;
unstable approach;
controlled flight into terrain;
foreign object damage/debris;
taxiing collision/near collision;
animal/bird strike;
wheels up landing.

2. The system according to claim 1, wherein the system is configured to generate an alert signal when the compared information indicates a risk or likelihood of at least four different occurrence types from the list of occurrence types in claim 1.

3. The system according to claim 1, wherein the system is configured to generate an alert signal when the compared information indicates a risk or likelihood of at least one occurrence from each of a first occurrence group of unsafe operation, and a second occurrence group of unsafe operation, wherein:

the first occurrence group comprises one or more runway occurrence types on or near the runway, including one or more of, or any combination of: runway excursion, runway incursion, runway undershoot, depart/approach/land wrong runway, missed approach/go around, and/or rejected take off; and the second occurrence group comprises one or more aircraft control occurrence types, including one or more of, or any combination of: unstable approach, hard landing, ground strike, controlled flight into terrain, collision with terrain (near and at airport), collision/near collision (near and at runway), and/or ground proximity alerts/warnings.

4. The system according to claim 3, wherein the system is further configured to generate an alert signal when the compared information indicates a risk or likelihood of at least one occurrence type from a third occurrence group comprising ground operation occurrence types; and the ground operation occurrence types comprise one or more of, or any combination of: foreign object damage/debris, jet blast/propeller/rotor wash, or taxiing collision/near collision.

5. The system according to claim 4, wherein the system is further configured to generate an alert signal when the compared information indicates a risk or likelihood of at least one occurrence type from a fourth occurrence group comprising environment occurrence types, and the environment occurrence types comprise one or more of, or any combination of: icing, lightning strike, or animal/bird strike.

6. The system according to claim 5, wherein the system is further configured to generate an alert signal when the compared information indicates a risk or likelihood of at least one occurrence type from a fifth occurrence group comprising infrastructure occurrences, including runway lighting occurrences or other infrastructure type occurrences.

7. The system according to claim 1, wherein the range sensor comprises a LiDAR sensor and the processing system is configured to calculate range information of at least one object of the at least two objects by using sensor information from the LiDAR sensor.

8. The system according to claim 7, wherein the processing system is configured to determine identity and/or classification information of at least one object of the at least two objects by using sensor information from the camera sensor and processing said sensor information using an artificial intelligence-based processing method.

9. The system according to claim 8, wherein the processing system is configured to apply a deep- and/or machine-learning detection process to calculate the identity and/or classification information.

10. The system according to claim 9, wherein the processing system is configured to associate the range information and the identity and/or classification information from the sensors to identify the at least one object in the field of view of the sensors.

11. The system according to claim 10, wherein the processing system, configured to associate the at least one identified object with time information, thereby provides measurement and/or tracking at least one physical property of the at least one identified object over time.

12. The system according to claim 11, wherein the processing system is configured to predict a physical property of the at least one identified object from tracked physical property information.

13. The system according to claim 12, wherein the comparison of the information associated with the at least one identified object with the predetermined safety operation criteria includes measured physical property information and predicted physical property information from the at least one identified object.

14. The system according to claim 11, wherein the measured and predicted physical property includes the aircraft's position, travel direction, velocity, acceleration, altitude and attitude, and other physical properties of aircraft of interest, and physical properties of other objects of interest including boundaries, markings, a centreline, a runway threshold, ground crew, a passenger, a ground vehicle, infrastructure and/or building structures.

15. The system according to claim 11, wherein the system is configured to receive and process additional information to assist and/or facilitate calculation of the at least two objects' physical properties, an estimation or prediction of their physical properties and/or the safe operation criteria.

16. The system according to claim 1, wherein the system is configured to monitor the aircraft ground location and/or measure and/or calculate an estimate or prediction of the aircraft position or motion on the runway, aircraft position deviation from runway centreline, distance between aircraft and runway boundary and/or runway end, and a predicted time and/or position for runway excursion including veer-off.

17. The system according to claim 1, wherein the system is configured to monitor an aircraft approach flight path and an aircraft landing configuration, to measure and/or calculate an estimate or prediction of acceptable deviation of measured flight path from an authorised or ideal flight path, and a likelihood of achieving safe touch-down or landing.

18. The system according to claim 1, wherein the system is configured to monitor and/or track the aircraft location, and/or measure and/or calculate an estimate or prediction of the lift-off position, and a last safe stopping point along a take-off roll.

19. A method for monitoring activities in an aviation environment, the method including the steps of:

obtaining sensor information of at least two objects from at least two monitoring units, the objects including at least one runway and at least one aircraft, the at least two monitoring units being physically deployed at a plurality of dedicated locations throughout the aviation environment including at least one location at or near the runway, and at least one further location spatially separated from the first location, on or near one or more of a runway, taxiway, apron, ground vehicle, or airport infrastructure;

the monitoring units each housing at least two types of sensors, including a range sensor and a camera sensor co-located within the monitoring unit, receiving said information, in real time, from the sensors at a processing system in real-time communication with the monitoring units, the processing system being configured to process said information to monitor and make predictions in relation to said at least two objects; the processing system being configured to combine the range sensor information with the camera sensor information by associating the sensor information with temporal information and spatial information by applying data fusion, wherein:

applying data fusion includes processing the range sensor information and the camera sensor information acquired from the sensors at the plurality of locations in the aviation environment, including:

applying a time-syncing process to the range sensor information and the camera sensor information acquired at the plurality of locations;

stitching or otherwise combining the range sensor information acquired at the plurality of locations to form a spatially registered composite range data representation;

stitching or otherwise combining the camera sensor information acquired at the plurality of locations; and projecting or otherwise fusing the acquired range sensor information onto the acquired camera sensor information, or projecting or otherwise fusing the acquired camera sensor information onto the acquired range sensor information, to generate a spatially and temporally unified representation of the aviation environment including the at least two objects and one or more aviation-environment features;

determining spatial and temporal relationships or interactions between (i) the at least two objects, (ii) at least one object of the at least two objects and at least one aviation-environment feature, and comparing the processed information associated with the at least two objects with predetermined safety operation criteria, generating an alert signal when the compared information indicates a risk or likelihood of at least three different occurrence types from the following list of occurrence types:

runway excursion;
runway incursion;
unstable approach;
controlled flight into terrain;
foreign object damage/debris;
taxiing collision/near collision;
animal/bird strike;
wheels up landing.

20. The method of claim 19, wherein the range sensor is a LiDAR sensor.

* * * * *